(12) United States Patent
Pacher et al.

(10) Patent No.: US 12,493,861 B2
(45) Date of Patent: Dec. 9, 2025

(54) SYSTEMS AND METHODS FOR IMPLEMENTING OFF-NETWORK SERVICES

(71) Applicant: MASTERCARD INTERNATIONAL INCORPORATED, Purchase, NY (US)

(72) Inventors: Fred M. Pacher, Williston Park, NY (US); Peter Groarke, Dublin (IE); Mikhail Blinov, Dun Laoghaire (IE); Edwin Diekemper, Troy, MO (US); Haritha Nannapaneni, Chesterfield, MO (US); Sivakumar Janardhanam, Perwez (BE); Wade Plummer, Chicago, IL (US); Prasad Krishnamoorthy Rao, Frisco, TX (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 18/150,717

(22) Filed: Jan. 5, 2023

(65) Prior Publication Data

US 2024/0232822 A1   Jul. 11, 2024

(51) Int. Cl.
G06Q 20/00 (2012.01)
G06Q 20/02 (2012.01)
(Continued)

(52) U.S. Cl.
CPC ......... *G06Q 20/027* (2013.01); *G06Q 20/351* (2013.01); *G06Q 20/40* (2013.01)

(58) Field of Classification Search
CPC ..... G06Q 20/027; G06Q 20/351; G06Q 20/40
(Continued)

(56) References Cited

U.S. PATENT DOCUMENTS

| 5,826,241 A | 10/1998 | Stein et al. |
| 5,933,816 A | 8/1999 | Zeanah et al. |

(Continued)

FOREIGN PATENT DOCUMENTS

| CN | 101449509 A | 6/2009 |
| CN | 101540032 A | 9/2009 |

(Continued)

OTHER PUBLICATIONS

Dynamic Secure Access Control and Data Sharing Through Trusted Delegation and Revocation in a Blockchain-Enabled Cloud-IoT Environment. Suhair Alshehri, Omaimah Bamasaq, Daniyal Alghazzawi, Arwa Jamioom. IEEE Internet of Things Jounal: 4239-56, IEEE (2023), dated Mar. 1, 2023. (Year: 2023).*

(Continued)

*Primary Examiner* — Hai Tran
(74) *Attorney, Agent, or Firm* — Armstrong Teasdale LLP

(57) ABSTRACT

A network services bridge system including a direct service access ("DSA") platform is provided. The DSA platform includes a processor configured to receive a request data signal including one or more identifiers, and query a registered services database using the one or more identifiers, where the query returns an identification of a plurality of services for which the one or more identifiers is registered. The processor is also configured to receive, from a first services platform, a first services result signal indicating a result of an application of a first service to the request data signal, receive, from a second services platform, a second services result signal indicating a result of an application of a second service to the request data signal, and transmit a response data signal that includes a consolidated response code indicating whether the authorization process should be completed based on the first and second result signals.

20 Claims, 10 Drawing Sheets

(51) Int. Cl.
  *G06Q 20/34* (2012.01)
  *G06Q 20/40* (2012.01)
(58) Field of Classification Search
  USPC .......................................................... 705/41
  See application file for complete search history.

(56) References Cited

U.S. PATENT DOCUMENTS

| | | | |
|---|---|---|---|
| 5,987,123 | A | 11/1999 | Scott et al. |
| 5,987,132 | A | 11/1999 | Rowney |
| 6,085,176 | A | 7/2000 | Woolston |
| 6,266,651 | B1 | 7/2001 | Woolston |
| 7,088,995 | B2 | 8/2006 | Rao |
| 7,252,223 | B2 | 8/2007 | Schofield |
| 7,296,065 | B2 | 11/2007 | Anderson et al. |
| 7,523,055 | B2 | 4/2009 | Anderson et al. |
| 8,214,233 | B2 | 7/2012 | Coyne |
| 8,527,427 | B2 | 9/2013 | Wankmueller |
| 10,043,181 | B2 | 8/2018 | Pacher et al. |
| 11,416,784 | B2 * | 8/2022 | Ibrahim ................ H04W 4/024 |
| 11,775,334 | B1 | 10/2023 | Doherty et al. |
| 11,818,115 | B1 | 11/2023 | Shah et al. |
| 2001/0011256 | A1 | 8/2001 | Hannula et al. |
| 2002/0035548 | A1 | 3/2002 | Hogan et al. |
| 2003/0121969 | A1 | 7/2003 | Wankmueller |
| 2004/0010462 | A1 | 1/2004 | Moon et al. |
| 2005/0080703 | A1 | 4/2005 | Chiesa |
| 2005/0121512 | A1 | 6/2005 | Wankmueller |
| 2006/0020542 | A1 | 1/2006 | Litle et al. |
| 2006/0069717 | A1 | 3/2006 | Mamou et al. |
| 2006/0271496 | A1 | 11/2006 | Balasubramanian et al. |
| 2007/0106619 | A1 | 5/2007 | Holdsworth |
| 2008/0040237 | A1 | 2/2008 | Crussol et al. |
| 2009/0150266 | A1 | 6/2009 | Dickelman |
| 2010/0138338 | A1 | 6/2010 | Hammad et al. |
| 2010/0161486 | A1 | 6/2010 | Liu et al. |
| 2011/0055058 | A1 | 3/2011 | Hammad et al. |
| 2011/0258115 | A1 | 10/2011 | Mulhim |
| 2012/0011066 | A1 | 1/2012 | Telle et al. |
| 2012/0035946 | A1 | 2/2012 | Coyne |
| 2012/0035947 | A1 | 2/2012 | Coyne |
| 2012/0072350 | A1 | 3/2012 | Goldthwaite et al. |
| 2012/0095918 | A1 | 4/2012 | Jurss |
| 2012/0143761 | A1 | 6/2012 | Doran et al. |
| 2012/0150671 | A1 | 6/2012 | Mercia et al. |
| 2012/0197760 | A1 | 8/2012 | Balasubramanian et al. |
| 2013/0024364 | A1 | 1/2013 | Shrivastava et al. |
| 2013/0191285 | A1 | 7/2013 | Rigby |
| 2013/0198071 | A1 | 8/2013 | Jurss |
| 2013/0246274 | A1 | 9/2013 | Marcous |
| 2013/0304648 | A1 | 11/2013 | OConnell et al. |
| 2014/0074724 | A1 | 3/2014 | Gordon et al. |
| 2014/0122198 | A1 | 5/2014 | Cheung et al. |
| 2021/0357937 | A1 * | 11/2021 | Kohli .................... G07F 7/1008 |
| 2021/0374747 | A1 * | 12/2021 | Ederle ................ G06Q 20/4012 |
| 2021/0397681 | A1 | 12/2021 | Boule |
| 2022/0058192 | A1 | 2/2022 | Fox et al. |
| 2022/0076255 | A1 * | 3/2022 | Arnold .................... G06Q 20/10 |
| 2022/0277295 | A1 | 9/2022 | Robinson-Morgan et al. |
| 2024/0231879 | A1 | 7/2024 | Doherty et al. |
| 2024/0244045 | A1 | 7/2024 | Grobelny |

FOREIGN PATENT DOCUMENTS

| | | |
|---|---|---|
| CN | 102197407 A | 9/2011 |
| CN | 102754114 A | 10/2012 |
| CN | 102792325 A | 11/2012 |
| CN | 102880959 A | 1/2013 |
| JP | 2000500256 A | 1/2000 |
| JP | 2002298055 A | 10/2002 |
| JP | 2005275459 A | 10/2005 |
| JP | 2006507563 A | 3/2006 |
| JP | 2007213305 A | 8/2007 |
| JP | 2007531924 A | 11/2007 |
| JP | 2012168782 A | 9/2012 |
| KR | 20110070614 A | 6/2011 |
| KR | 20110134381 A | 12/2011 |
| KR | 20140138871 A | 12/2014 |
| KR | 20170102877 A | 9/2017 |
| KR | 101898170 B1 | 9/2018 |
| WO | 2011049872 A2 | 4/2011 |
| WO | 2011133899 A2 | 10/2011 |
| WO | 2011153281 A2 | 12/2011 |
| WO | 2023218358 A1 | 11/2023 |

OTHER PUBLICATIONS

Anonymous: "Gateway (telecommunications)", Mar. 12, 2013 (Mar. 12, 2013), XP055501726, Retrieved from the Internet: URL: https://en.wikipedia.org/w/index.php?title=Gateway_(telecommunications)&oldid=532733133 [retrieved on Aug. 23, 2018].
Chaudhary, K, Yadav, J., Mallick, B. , "A review of Fraud Detection Techniques: Credit Card", May 2012, International Journal of Computer Applications (0975-8887), vol. 45—No. 1 (Year: 2012).
Chinese Notification to Grant Patent Right for Invention, and English translation, dated Jul. 1, 2019 for CN patent application No. 201380074569.6, 3 pages.
Chinese Office Action, and English translation, dated Mar. 22, 2019 for CN patent application No. 201380074569.6, 7 pages.
Chinese Office Action, and English translation, dated Sep. 30, 2018 for CN patent application No. 201380074569.6, 27 pages.
Chinese Search Report, dated Sep. 21, 2018 for CN patent application No. 201380074569.6, 2 pages.
European Office Action, dated Dec. 18, 2017 for EP patent application No. 13871910.9, 7 pages.
Extended European Search Report for European Application No. 13871910.9, dated May 19, 2016, 9 pages.
Japanese Decision of Refusal, and English translation, dated Feb. 20, 2018 for JP patent application No. 2015-552628, 6 pages.
Japanese Decision to Grant a Patent, and English translation, dated Dec. 3, 2019 for JP patent application No. 2018-116075, 5 pages.
Japanese Notice for Reasons of Refusal, and English translation, dated Sep. 3, 2019 for JP patent application No. 2018-116075, 4 pages.
Japanese Notice for Reasons of Refusal, and English translation, dated Sep. 5, 2017 for JP patent application No. 2015-552628, 6 pages.
Japanese Search Report, and English translation, dated Aug. 24, 2017 for JP patent application No. 2015-552628, 24 pages.
Korean Grant of Patent, and English translation, dated Jul. 31, 2020 for KR patent application No. 10-2015-7021696, 4 pages.
Korean Notification of Reason for Refusal, and English translation, dated Dec. 31, 2019 for KR patent application No. 10-2015-7021696, 6 pages.
Korean Notification of Reason for Refusal, and English translation, dated Mar. 31, 2019 for KR patent application No. 10-2015-7021696, 14 pages.
Means of Redress, dated May 15, 2019 for EP patent application No. 13871910.9, 12 pages.
Mhamane, S., Lobo L.M.R.J., "Fraud Detection in Online Banking Using HMM", 2012, 2012 International Conference on information and Network Technology, IPCSIT vol. 37 2012 (Year: 2012).
PCT International Search Report and Written Opinion dated Jan. 28, 2014 for international application No. PCT/US2013/064913, 11 pages.
Summons to Attend Oral Proceedings, dated Sep. 18, 2018 for EP patent application No. 13871910.9, 11 pages.
China First Office Action, Application No. 201910872952.5, dated Nov. 18, 2022, 26 pps.: with English translation.
PCT International Search Report and Written Opinion, Application No. PCT/US2023/082508, dated Apr. 4, 2024, 8 pages.
PCT International Search Report and Written Opinion, Application No. PCT/US2025/010878, dated Apr. 24, 2025, 9 pages.

* cited by examiner

SYSTEMS AND METHODS FOR IMPLEMENTING OFF-NETWORK SERVICES

BACKGROUND

The field of the disclosure relates generally to systems and methods for processing payment transactions and, more particularly, to systems and methods for applying off-network payment services to a home payment network payment transaction, wherein the home payment network payment transaction originates on a first payment network and the payment services are provided by a computing device associated with a second payment network.

The payment card industry allows for issuer banks and cardholders to use payment services, sometimes known as transaction enrichment services, in conjunction with transactions performed over a payment network. In some payment systems, these payment services allow a cardholder, using an interface, to register for such services.

These payment services may include, for example, predefined spending limits for a particular payment card. However, under these known systems, these payment services are only accessible for transactions performed over the "home" payment network. In other words, the payment services can only be applied to payment transactions that originate and are processed over the payment network offering the payment services.

As more and more payment transactions are being performed on different payment networks, it is desirable to offer payment services for transactions originating on payment networks other than the payment network where the transaction originated.

BRIEF DESCRIPTION

In one aspect, a network services bridge computing system is provided. The network services bridge computing system includes a direct service access ("DSA") platform that includes a memory and at least one processor in communication with the memory and with a plurality of services platforms. The memory stores instructions executable to cause the at least one processor to receive, from a requestor computing device, a first request data signal including a plurality of elements, wherein the first request data signal is associated with a first authorization process and includes one or more identifiers, the one or more identifiers including at least one of an account identifier or a requestor identifier. The instructions also cause the at least one processor to query a registered services database using the one or more identifiers, wherein the query returns an identification of a plurality of services for which the one or more identifiers is registered, the plurality of services including a first service implemented on a first of the services platforms and a second service implemented on a second of the services platforms. The instructions further cause the at least one processor to transmit at least a first portion of the first request data signal to the first services platform and receive, from the first services platform, a first services result signal indicating a result of an application of the first service to the first request data signal. In addition, the instruction cause the at least one processor to transmit at least a second portion of the first request data signal to the second services platform and receive, from the second services platform, a second services result signal indicating a result of an application of the second service to the first request data signal. The instructions also cause the at least one processor to transmit, to the requestor computing device, a first response data signal that includes a consolidated response code, the consolidated response code indicating whether the first authorization process should be completed based on the first and second result signals.

In another aspect, a computer-implemented method using a network services bridge computing system is provided. The network services bridge computing system includes a direct service access ("DSA") platform that includes a memory and at least one processor in communication with the memory and with a plurality of services platforms. The method includes receiving, from a requestor computing device, a first request data signal including a plurality of elements, wherein the first request data signal is associated with a first authorization process and includes one or more identifiers, the one or more identifiers including at least one of an account identifier or a requestor identifier. The method also includes querying a registered services database using the one or more identifiers, wherein the query returns an identification of a plurality of services for which the one or more identifiers is registered, the plurality of services including a first service implemented on a first of the services platforms and a second service implemented on a second of the services platforms. The method further includes transmitting at least a first portion of the first request data signal to the first services platform and receive, from the first services platform, a first services result signal indicating a result of an application of the first service to the first request data signal. In addition, the method includes transmitting at least a second portion of the first request data signal to the second services platform and receive, from the second services platform, a second services result signal indicating a result of an application of the second service to the first request data signal. The method also includes transmitting, to the requestor computing device, a first response data signal that includes a consolidated response code, the consolidated response code indicating whether the first authorization process should be completed based on the first and second result signals.

In yet another aspect, at least one non-transitory computer-readable storage medium that includes computer-executable instructions embodied thereon is provided. When the computer-executable instructions are executed by at least one processor of a direct service access ("DSA") platform, the computer-executable instructions cause the at least one processor to receive, from a requestor computing device, a first request data signal including a plurality of elements, wherein the first request data signal is associated with a first authorization process and includes one or more identifiers, the one or more identifiers including at least one of an account identifier or a requestor identifier. The computer-executable instructions also cause the at least one processor to query a registered services database using the one or more identifiers, wherein the query returns an identification of a plurality of services for which the one or more identifiers is registered, the plurality of services including a first service implemented on a first of the services platforms and a second service implemented on a second of the services platforms. The computer-executable instructions further cause the at least one processor to transmit at least a first portion of the first request data signal to the first services platform and receive, from the first services platform, a first services result signal indicating a result of an application of the first service to the first request data signal. In addition, the computer-executable instructions cause the at least one processor to transmit at least a second portion of the first request data signal to the second services platform and receive, from the second services platform, a second services result signal indicating a result of an application of the second service to the first request data signal. The computer-executable instructions also cause the at least one processor to transmit, to the requestor computing device, a first response data signal that includes a consolidated response code, the consolidated response code indicating whether the first authorization process should be completed based on the first and second result signals.

In yet another aspect, a network services bridge computing system that includes a direct service access (DSA) platform is provided. The DSA platform includes a memory and at least one processor in communication with the memory and with at least one services platform. The memory stores instructions executable to cause the at least one processor to: receive, from a first requestor computing device via a network switch, a first request data signal formatted according to a communications standard for exchange of financial transaction data between financial institutions, the communications standard defining a plurality of data fields to be included within data signals compliant with the communications standard, wherein the first request data signal is associated with a first authorization process and includes a first identifier, the first identifier including one of a first account identifier in an account-number field of the plurality of data fields or a first requestor identifier in a requestor-identifier field of the plurality of data fields. The processor further programmed to receive, from a second requestor computing device via a gateway for an application programming interface (API), a second request data signal formatted according to a hypertext transfer protocol (HTTP), the API defining a plurality of parameters corresponding to the plurality of data fields of the communications standard, wherein the second request data signal is associated with a second authorization process and includes a second identifier, the second identifier including one of a second account identifier in an account-number parameter of the plurality of parameters or a second requestor identifier in a requestor-identifier parameter of the plurality of parameters. The processor further programmed to transmit at least one query to a registered services database on the first identifier and the second identifier, wherein the at least one query returns an identification of at least one service for which the first and second identifiers are registered; transmit at least a portion of the first request data signal to the at least one services platform and receive, from the at least one services platform, a first services result signal indicating a result of an application of the at least one service to the first request data signal; and transmit at least a portion of the second request data signal to the at least one services platform and receive, from the at least one services platform, a second services result signal indicating a result of an application of the at least one service to the second request data signal. The processor further programmed to transmit, to the first requestor computing device via the network switch, a first response data signal formatted according to the communications standard, wherein the first response data signal includes a first response code in a response-code field of the plurality of data fields, the first response code indicating whether the first authorization process should be completed based on the first services result signal; and transmit, to the second requestor computing device via the gateway for the API, a second response data signal formatted according to HTTP, wherein the second response data signal includes a second response code in a response-code parameter of the plurality of parameters, the second response code indicating whether the second authorization process should be completed based on the result of the application of the at least one service to the second services result signal.

DETAILED DESCRIPTION OF THE DISCLOSURE

Figure 1:
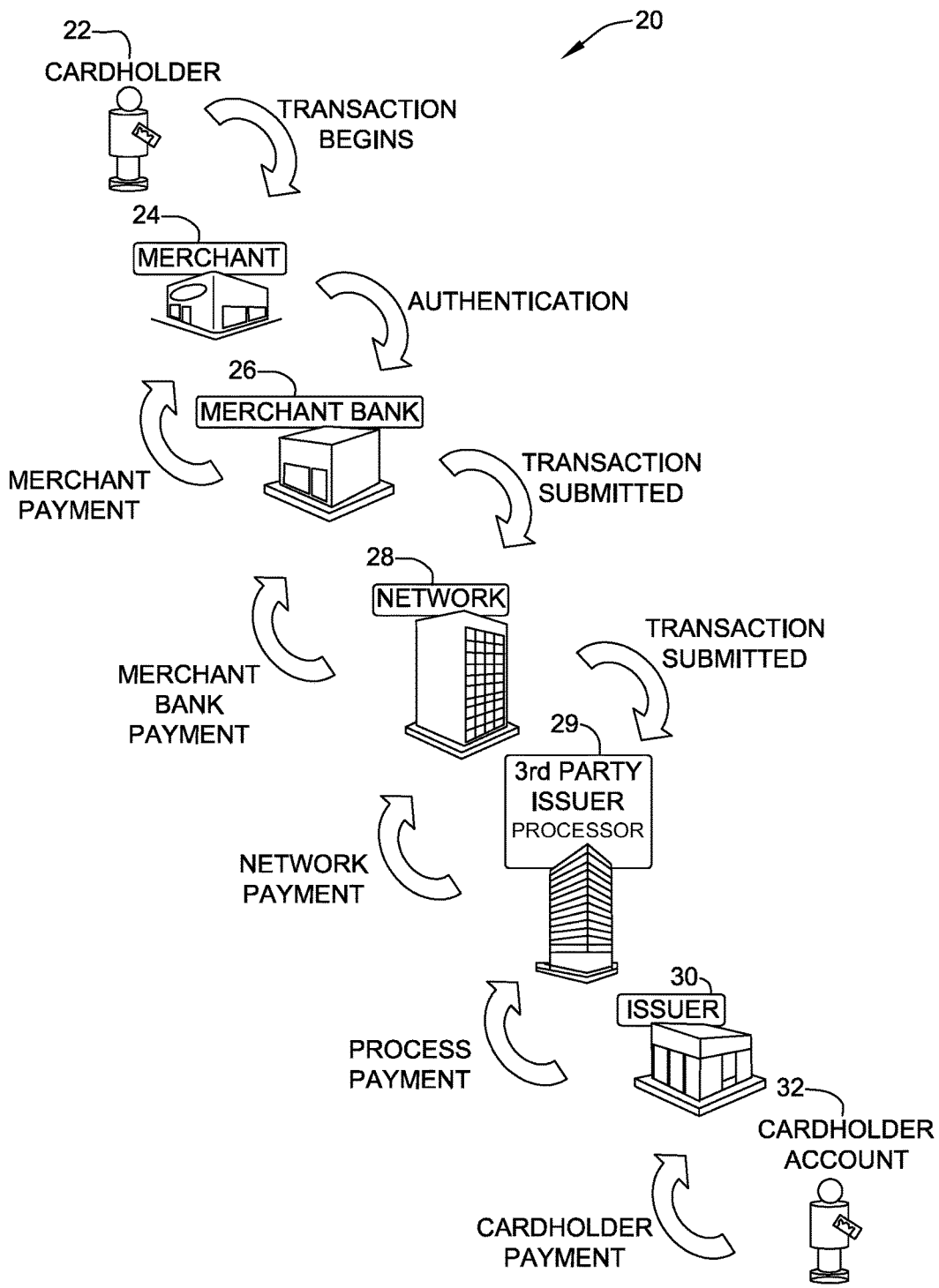
FIG. 1 is a schematic diagram illustrating an example multi-party payment card industry system for enabling payment transactions in which merchants and card issuers do not necessarily have a one-to-one relationship.

The following detailed description illustrates embodiments of the disclosure by way of example and not by way of limitation. It is contemplated that the systems and processes described herein have general application to the aspect of processing payment card transactions. More specifically, the embodiments of the systems and methods described herein relate generally to a payment card transaction that is initiated over a first payment network (e.g., the home network), and a payment services computer system that is associated with a second payment network (e.g., off network), wherein the payment services computer system is configured to receive a request from a requestor to apply payment services to the transaction, apply the payment services to the transaction, and transmit an output to the requestor. Because this transaction is initiated on one payment network (e.g., the first payment network), and processed by the payment services computer system on another payment network (e.g., the second payment network), the transaction is sometimes referred to as an off-network transaction. In the example embodiment, an off-network payment card transaction is a payment card transaction that is initiated and processed over a payment network that is different from the payment network providing payment services to the transaction.

Described in detail herein are example embodiments of systems and methods for applying off-network payment services to a home payment network payment transaction. The systems and methods facilitate, for example, applying off-network payment services such as cardholder authorization controls to a home payment network payment transaction, wherein the authorization controls are configured to identify, for example, whether the transaction was initiated outside a geographical region allowed by the authorization controls. The systems and methods described herein include a payment services computer system configured to receive a request associated with a payment transaction from a first payment network (e.g., a payment network that is not hosting the payment services) at a second payment network (e.g., a payment network that is hosting the payment services), apply the payment services, as appropriate, to the payment transaction, and transmit an output to the requestor.

The methods and systems described herein may be implemented using computer programming or engineering techniques including computer software, firmware, hardware or any combination or subset thereof, wherein the technical effect may be achieved by performing at least one of the following steps: (a) receiving a service request generated by a requestor at a payment services computer system, where the service request relates to a first payment network payment card transaction, and where the service request has a first format that is readable by a second payment network; (b) determining, at the payment services computer system, the payment services the service request is registered to receive; (c) processing the service request by applying the registered payment services to the service request; (d) generating a services response based at least in part on the registered payment services and payment transaction data associated with the first payment network payment card transaction; and (e) transmitting the service response to at least one of the requestor and a cardholder of payment account associated with the first payment network payment card transaction.

As used herein, an acquiring bank or acquirer is typically a bank (or financial institution) at which a merchant holds an account. Further, an issuing bank or issuer (or financial institution) is typically a bank at which a customer or cardholder holds an account. The account may be debited or charged through the use of a debit card, a credit card, or another type of payment card as described herein.

As used herein, the terms "payment card," "financial transaction card," and "transaction card" refer to any suitable payment card, such as a credit card, a debit card, a prepaid card, a charge card, a membership card, a promotional card, a frequent flyer card, an identification card, a gift card, and/or any other device that may hold payment account data, such as mobile phones, smartphones, smart cards, digital wallets, personal digital assistants (PDAs), key fobs, and/or computers. Each type of payment card can be used as a method of payment for performing a transaction. In addition, cardholder account behavior can include but is not limited to purchases, management activities (e.g., balance checking), bill payments, achievement of targets (meeting account balance goals, paying bills on time), and/or product registrations (e.g., mobile application downloads).

As used herein, the term "translation module" and related terms, e.g., "translation module system," refers to a method of converting service requests from a format used on the first payment network (e.g., by an issuer bank) to a format that may be read by the second payment network and vice versa. The translation module may include, without limitation, a data layout protocol, an algorithm for mapping service requests from the first payment network format to the second payment network format and vice versa, and an automated program that converts service requests from the first payment network format to the second payment network format and vice versa.

As used herein, the term "home payment network" and related terms, e.g., "home network," refers to a first payment network where the cardholder originates payment card transactions and may register for payment services (whether those services are actually provided by or performed by the home network). Such home payment networks may include any payment networks capable of using the system and method described herein.

As used herein, the term "off-network payment network" and related terms, e.g., "off-network," may refer to a second payment network that is different from the home payment network where a payment card transaction may be originated. As used herein, off-network payment network is capable of receiving service requests from home payment network and providing payment services for payment card transactions originating with home payment network by cardholders who have registered for the payment services using, for example, the home payment network.

As used herein, the term "network processor" and related terms, e.g., "off-network processor" and "home network processor," refers to computing device(s) associated with a payment network that may be used to communicate data between computing devices associated with an issuer bank, a cardholder, a merchant, an acquirer bank, a payment aggregator, a payment gateway, a government, a financial technology ("Fintech") system, and/or an account clearing house ("ACH") system, and communicate with computing device(s) that may be used to provide network services such as payment services. Also, as used herein, the home network processor may be configured to receive requests from a requestor and send first service requests to the translation module.

As used herein, the term "requestor" refers to the creator and sender of a first service request based upon account registration or a payment transaction. The requestor is the person or entity that is requesting the value-added service (VAS), which in some cases is done on behalf of another party, who is sometimes referred to as the VAS recipient or the entity receiving or getting the VAS service (e.g., the entity paying for the VAS service or on whose behalf the VAS service is being carried out). Thus, the requestor may be either the aggregator, processor, ACH etc. who request the service, and the entity receiving the VAS service may be for example: the merchant, the acquirer, the card issuer, the bank account institution (whose IBAN is it), and/or crypto exchange (Bitstamp, Binance, etc. or whoever owns the crypto wallet sending or receiving a payment). Also, as used herein, the requestor generates the first service request and uses either the requestor computing device translation module or the receiving network computing device translation module to translate or convert it to a second service request. Another option would be to use a REST connection to provide the translation.

As used herein, a processor includes a programmable system including systems using microcontrollers, reduced instruction set circuits (RISC), application specific integrated circuits (ASICs), logic circuits, and any other circuit or processor capable of executing the functions described herein. The above examples are example only, and thus are not intended to limit the definition and/or meaning of the term "processor" in any way.

In one embodiment, computer-executable instructions are provided and are embodied on a non-transitory computer readable storage medium. The computer-executable instructions cause a computer executing the instructions to utilize a Structured Query Language (SQL) with a client user interface front-end for administration and a web interface for standard user inputs and reports. In an example embodiment, the system is web-enabled and is run on a business entity intranet. In an alternative embodiment, the system is fully accessible by individuals having authorized access from outside a firewall of the business-entity through the Internet. In a further alternative embodiment, the system is run in a Windows® environment (Windows is a registered trademark of Microsoft Corporation, Redmond, Wash.). The application is flexible and designed to run in various different environments without compromising any major functionality.

FIG. 1 is a schematic diagram illustrating an example multi-party payment card industry system 20 for enabling payment transactions in which merchants 24 and card issuers 30 do not necessarily have a one-to-one relationship. Embodiments described herein may relate to a payment card system, such as a credit card payment system using the Mastercard® interchange network (Mastercard is a registered trademark of Mastercard International Incorporated located in Purchase, New York). The Mastercard interchange network is a set of proprietary communications standards promulgated by Mastercard International Incorporated for the exchange of financial transaction data and the settlement of funds between financial institutions that are members of Mastercard International Incorporated. In a typical payment card system, a financial institution called the "issuer" issues a payment card, such as a credit card, to a consumer or cardholder 22, who uses the payment card to tender payment for a purchase from a merchant 24. To accept payment with the payment card, merchant 24 must normally establish an account with a financial institution that is part of the financial payment system. This financial institution is usually called the "merchant bank," the "acquiring bank," or the "acquirer," such as a merchant bank 26. When cardholder 22 tenders payment for a purchase with a payment card, merchant 24 sends an authorization request message to merchant bank 26 for the amount of the purchase. The request may be performed over the telephone, but may be also performed through the use of a computing device having access to a website enabling input of cardholder's 22 account information, or the use of a point-of-sale device, which reads cardholder's 22 account data from a magnetic stripe, a chip, or embossed characters on the payment card and communicates electronically with the transaction processing computers of merchant bank 26. Alternatively, merchant bank 26 may authorize a third party to perform transaction processing on its behalf. In this case, the point-of-sale device will be configured to communicate with the third party. Such a third party is usually called a "merchant processor," an "acquiring processor," or a "third party processor."

Using an interchange network 28, computers of merchant bank 26 will communicate transaction data with computers of an issuer processor 29 associated with an issuer 30. Issuer processor 29 may be a third party processor authorized to perform transaction-related services on behalf of issuer 30, including payment card production services, payment card processing services, fraud detection services, data delivery services, ATM driving services, transaction research, and cardholder support services. Issuer processor 29 may also provide interbank switch processing, including authorization, clearing and settlement, and value-added services. This enables issuer 30 to use one card processor for all different payment card brands. In an alternative embodiment, issuer processor 29 may be associated with interchange network 28 and may provide similar services.

Issuer 30 receives the transaction data from issuer processor 29, and then determines whether cardholder's 22 account 32 is in good standing and whether the purchase is covered by cardholder's 22 available credit limit. Based on these determinations, the request for authorization will be declined or accepted. If the request is accepted, an authorization code is issued to merchant 24.

When a request for authorization is accepted, the available credit line of cardholder's 22 account 32 is decreased. Normally, a charge for a payment card transaction is not posted immediately to cardholder's 22 account 32 because bankcard associations, such as Mastercard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale device. This may include bundling of approved transactions daily for standard retail purchases. If cardholder 22 cancels a transaction before it is captured, a "void" is generated. If cardholder 22 returns goods after the transaction has been captured, a "credit" is generated. Interchange network 28 and/or issuer 30 stores the payment card data, such as a type of merchant, amount of purchase, date of purchase, in a database 308 (shown in FIG. 4).

After a purchase has been made, a clearing process occurs to transfer additional transaction data related to the purchase among the parties to the transaction, such as merchant bank 26, interchange network 28, issuer processor 29, and issuer 30. More specifically, during and/or after the clearing process, additional data, such as a time of purchase, a merchant name, a type of merchant, purchase data, cardholder account data, a type of transaction, itinerary data, data regarding the purchased item and/or service, and/or other suitable information, is associated with a transaction and transmitted between parties to the transaction as transaction data, and may be stored by any of the parties to the transaction.

After a transaction is authorized and cleared, the transaction is settled among merchant 24, merchant bank 26, interchange network 28, issuer processor 29, and issuer 30. Settlement refers to the transfer of financial data or funds among merchant's 24 account, merchant bank 26, issuer processor 29, and issuer 30 related to the transaction. Usually, transactions are captured and accumulated into a "batch," which is settled as a group. More specifically, a transaction is typically settled between issuer 30 and issuer processor 29, and then between issuer processor 29 and interchange network 28, and then between interchange network 28 and merchant bank 26, and then between merchant bank 26 and merchant 24.

Figure 2:
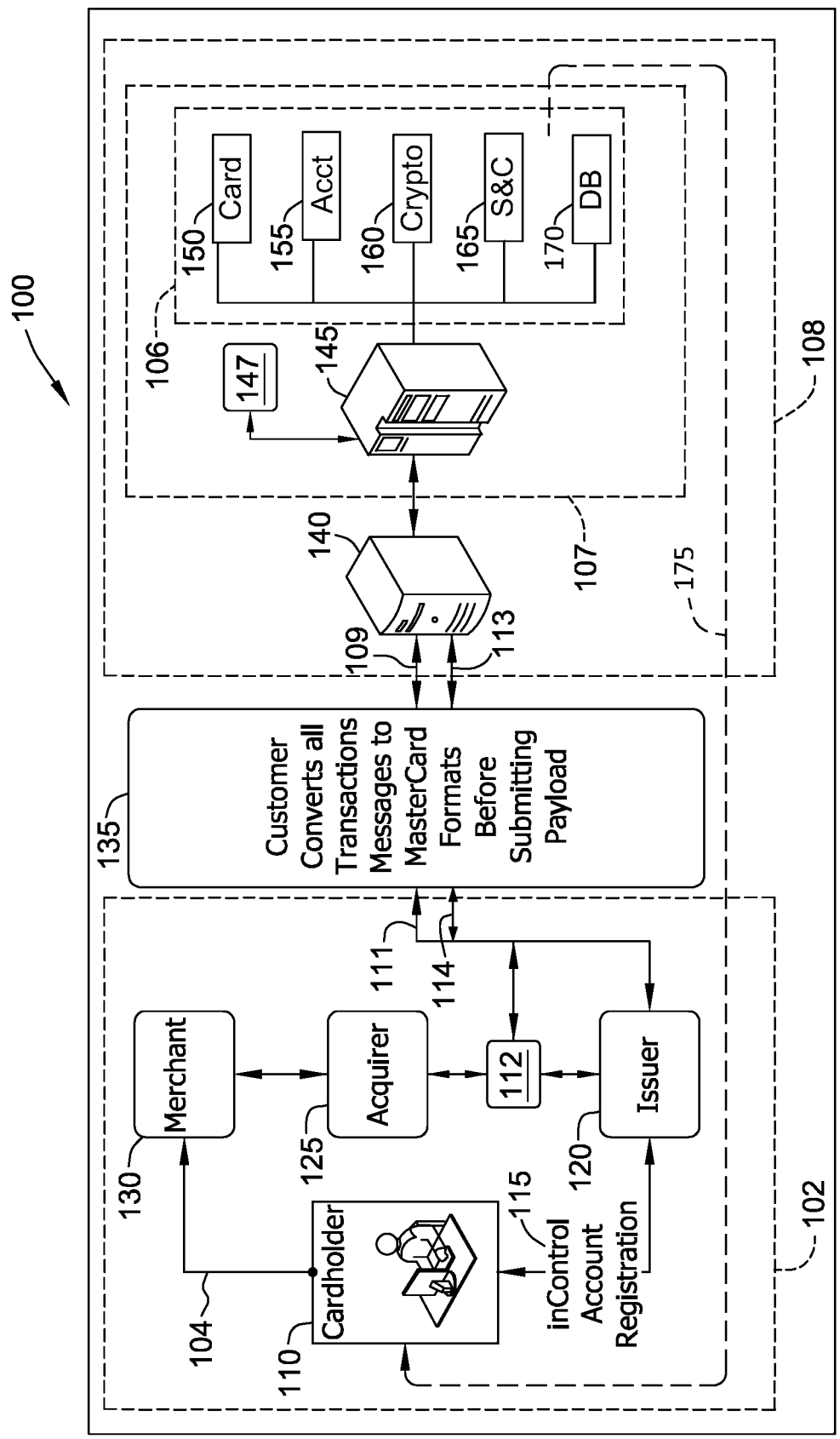
FIG. 2 is a data flow diagram showing a payment processing environment in accordance with one embodiment of the present disclosure.

FIG. 2 is a data flow diagram showing a payment processing environment 100 in accordance with one embodiment of the present disclosure. Environment 100 includes a home payment network 102 where a payment transaction 104 or account registration 115 originates and a first service request 111 is sent, a transfer process 135 where first service request 111 is converted to a second service request 109, and an off-network payment network 108 where a payment services computer system 107 resides.

Home payment network 102 includes a cardholder 110, an issuer 120, an acquirer 125, a merchant 130, and home network processor 112. Cardholder 110, issuer 120, acquirer 125, merchant 130, and home network processor 112 may be similar to cardholder 22, issuer 30, merchant bank 26, merchant 24, and issuer processor 29, respectively, as shown in FIG. 1.

Cardholder 110 is capable of making payment transaction 104 to merchant 130 by initiating payment transaction 104 with merchant 130. Cardholder 110 is also capable of account registration 115 with issuer 120. Home payment network 102 is capable of communicating with off-network payment network 108 by sending first service request 111 associated with account registration 115 and/or payment transaction 104 to transfer process 135. First service request 111 may be sent by home network processor 112 and/or issuer 120 and/or other requestors including, but not limited to, acquirers, merchants, payment aggregators, payment gateways, government entities, financial technology ("Fintech") systems, and account clearing house ("ACH") systems, which may request the VAS service on behalf of another entity who is the recipient of the VAS service.

Transfer process 135 is configured to allow first service request 111 to be converted to second service request 109 that may be processed using payment services computer 107 at off-network payment network 108. Transfer process 135 includes converting first service request 111 into second service request 109 using a translation module. In the example embodiment, the translation module refers to a data layout protocol indicating a method of converting a first data file format associated with home payment network 102 (e.g., first service request 111) to a second data file format associated with off-network payment network 108 (e.g., second service request 109). In alternative embodiments, the translation may include, without limitation, an algorithm for mapping service requests from the first data file format to the second data file format, or an automated program that converts first service request 111 to second service request 109. Transfer process 135 is also configured to send second service request 109 to an interface processor 140 at off-network payment network 108. Transfer process 135 further includes enabling first services responses 113 to be converted to second services responses 114 (described below). The transfer module is accordingly also configured to convert a second data file format associated with off-network payment network 108 to a first data file format associated with home payment network 102.

Off-network payment network 108 includes interface processor 140, an off-network processor 147, and payment services computer system 107. Interface processor 140 is representative of a computing device capable of receiving second service request 109 from transfer process 135. Interface processor 140 is also capable of determining whether second service request 109 contains account identifiers associated with payment services 106. Interface processor 140 is further capable of communicating with payment services computer system 107 to register or apply payment services 106.

Payment services computer system 107 includes a payment services platform 145, such as the Mastercard® inControl™ platform ("MIP"). Mastercard® inControl™ platform is a proprietary payment services platform created by Mastercard International Incorporated® for providing cardholder services associated with the exchange of financial transaction data between financial institutions that are members of Mastercard International Incorporated®. (Mastercard is a registered trademark of Mastercard International Incorporated located in Purchase, New York). Payment services platform 145 is capable of communicating with interface processor 140 and registering an account to use payment services 106 or applying payment services 106 associated with home payment network 102 to payment transaction 104. Payment services computer system 107 also includes off-network processor 147 which is capable of communicating with off-network issuer bank (not shown) and providing payment services 106 to transactions initiated by an off-network cardholder (not shown).

Cardholder 110 initially registers for payment services 106 (VAS services) with issuer 120 using account registration 115. The registration may be API driven. In some cases, cardholder 110 may also register with other parties utilizing the system or by deriving the relationship between cardholder 110 and issuer 120 from the PAN and the bank account IBAN used for the transaction or alternatively by deriving the relationship between the PAN, the bank account and the wallet ID by certain parties involved in the transaction. For example, the relationship between cardholder 110 and issuer 120 may be known by issuer 120 or derived by acquirer 125 using information associated with the relationship between merchant 130 and cardholder 110.

In the example embodiment, account registration 115 represents a web-based service allowing cardholder 110 to register for payment services 106 at a website hosted by issuer 120. In the example embodiment, issuer 120 transmits registration information to home network processor 112 which converts registration information using transfer process 135 to a format that may be received by interface processor 140. In alternative embodiments, issuer 120 may convert registration information using transfer process 135 without using home network processor 112. In the example embodiment, account registration 115 includes an account identifier (e.g., an account number) associated with the payment card used for initiating payment transaction 104. The account identifier may be a primary account number (PAN), a real card number (RCN), or any other type of identifier that identifies or represents an account associated with payment transaction 104.

Account registration 115 further includes payment services 106 to be associated with the account identifier. In the example embodiment, payment services 106 may include card services 150, account services 155, cryptocurrency services 160, and switching clearing services 165. Records associated with payment services 106 are stored in a registered services database 170 accessible by payment services platform 145. For example, when a requestor on home network 102 registers with off-network payment network 108 for access to the one or more services 106, a record is stored in registered services database 170.

Account registration 115 also includes using transfer process 135 to convert registration data to a format that can be used with payment services computer system 107. Transfer process 135 uses the translation module to convert registration data into a registration profile and transmits the registration profile to payment services computer system 107. Here, the translation module is used to convert a first data file format associated with home payment network 102 (e.g., registration data) to a second data file format associated with off-network payment network 108 (e.g., the registration profile).

Once cardholder 110 has registered 115 for payment services 106 and the registration profile has been transmitted to interface processor 140 and sent to payment services computer system 107, payment services computer system 107 is capable of providing payment services 106 when cardholder 110 initiates payment transaction 104 over home payment network 102.

Cardholder 110 further initiates payment transaction 104 over home payment network 102 with merchant 130 using a payment card. Payment transaction 104 includes an account identifier (e.g., a PAN) and transaction details. Payment transaction 104 also includes payment transaction data. The payment transaction data may include, without limitation, the time of payment transaction 104, the date of payment transaction 104, the amount of payment transaction 104, merchant 130 associated with payment transaction 104, the category associated with merchant 130 associated with payment transaction 104, the geographic location of payment transaction 104, and the purchase category (e.g., food, clothing, or computers) of payment transaction 104.

Merchant 130 then sends an authorization request over home payment network 102 for payment transaction 104 to acquirer 125. Acquirer 125 sends the authorization request along to issuer 120. In one embodiment, acquirer 125 transmits the authorization request to home network processor 112 which determines whether the account associated with payment transaction 104 is eligible for payment services 106. In alternative embodiments, home network processor 112 sends the authorization request to issuer 120, and issuer 120 determines whether the account associated with payment transaction 104 is eligible for payment services 106. The entity that determines whether the account associated with payment transaction 104 is eligible for payment services 106 is defined as a requestor and generates first service request 111. In some cases, the entity that determines whether the account is eligible for payment services 106 may include entities such as: the merchant, the acquirer, the issuer, the processor, the aggregator or any other party involved in the transaction that is able to derive the relationship between the cardholder and the issuer from the data being processed. Determining whether the account is eligible for payment services 106 is representative of determining whether cardholder 110 has registered the account identifier included in the authorization request with payment services 106. In the example embodiment, home network processor 112 will search a memory device, such as registered services database 170, to determine if the account identifier is registered with issuer 120 for payment services 106. In other embodiments, issuer 120 will search a memory device, such as registered services database 170, to determine if the account identifier is registered with issuer 120 for payment services 106. In alternative embodiments, issuer 120 may send a request to off-network payment network 108 to determine if the account identifier included in the authorization request is registered with payment services 106.

If the account is eligible, the requestor will continue to process payment transaction 104, and will generate first service request 111. First service request 111 is converted, using transfer process 135, into second service request 109. Transfer process 135 uses the translation module to convert first service requests 111 to second service requests 109. The translation module ensures that second service requests 109 conform to identical file naming conventions, file header conventions, file structure and layout conventions, file type conventions, and file size conventions. In an alternative embodiment, first service requests 111 are converted using a translation module implementing XML-based transformational methods. In other embodiments, first service requests 111 may be converted using translation modules implementing any transformational method or language including, without limitation, Perl, AWK, TXL, or any other method capable of converting first service requests 111 to apply names, headers, layouts, structures, file types, and file sizes required for second service requests 109.

Second service request 109 is transmitted to and received by interface processor 140 which determines whether the account identifier associated with second service request 109 is registered for payment services 106. If the account identifier associated with second service request 109 is determined to be registered for payment services 106, interface processor 140 transmits second service request 109 to payment services platform 145. Payment services platform 145 processes second service request 109 by applying registered payment services 106 to second service request 109. Applying registered payment services 106 represents applying at least one payment service 106 if second service request 109 requires such application. As described above, payment services 106 include card services 150, account services 155, cryptocurrency services 160, and switching clearing services 165. Each payment service 106 is associated with rules and conditions for applying service 106. If payment service 106 should be applied, payment services platform 145 generates first services response 113 based, at least in part, on payment services 106 and payment transaction data associated with second service request 109. Payment services computer system 107 transmits first services response 113 to interface processor 140. First services response 113 is then sent back to transfer process 135.

Here, transfer process 135 uses the translation module to facilitate converting first services responses 113 into second services responses 114. The translation module is now used to reverse the process described when first service request 111 was converted to second service request 109. The transfer module allows a reversed conversion of first services responses 113 into second services responses 114 conforming to identical file naming conventions, file header conventions, file structure and layout conventions, file type conventions, and file size conventions associated with home payment network 102. In the example embodiment, first services responses 113 are converted using a translation module implementing XML-based transformational methods. In alternative embodiments, first services responses 113 may be converted using translation modules implementing any transformational method or language including, without limitation, Perl, AWK, TXL, or any other method capable of converting first services responses 113 to apply names, headers, layouts, structures, file types, and file sizes required for second services responses 114.

Second services response 114 is then transmitted back to the requestor (e.g., home network processor 112 or issuer 120) that sent first service request 111 to transfer process 135. In the example embodiment, when the requestor is home network processor 112, the requestor will communicate with acquirer 125 (e.g., return an authorization response denying or approving a payment transaction to merchant 130 based upon the application of transaction rules and limits service) and/or cardholder 110 (e.g., to alert cardholder based upon the application of payment services 106) depending on the contents of second services response 114. In alternative embodiments, when the requestor is issuer 120, the requestor will either act on the contents of second services response 114 (e.g., instruct acquirer 125 to deny or approve a payment transaction based upon the application of transaction rules and limits service) or communicate with cardholder 110 (e.g., to alert cardholder based upon the application of payment services 106).

Payment transaction 104 may be associated with an account identifier that is registered for payment services 106. In this example, payment transaction 104 is processed as described above and results in at least one of two outcomes. First, first services response 113 may be generated and converted to second services response 114 resulting in alerting cardholder 110 that the payment card associated with cardholder 110 has been used in payment transaction 104. Second, payment services 106 may trigger an SMS (i.e., Short Message Service text messaging) or email alert 175 sent directly from payment services computer system 107.

In the first example, cardholder 110 may use account registration 115 which creates a registration profile on payment services computer system 107. The registration profile may include information reflecting that cardholder 110 would like to be notified by the requestor when the credit card balance associated with cardholder 110 exceeds a threshold of $3,000. The registration profile is therefore registered for payment services 106 with this condition (e.g., alerts should be sent by the requestor when the credit card balance exceeds $3,000) applied. Payment transaction 104 is made for $500 using account identifiers corresponding to cardholder 110 with merchant 130. Prior to payment transaction 104, the credit card balance associated with cardholder 110 was $2,900. Payment transaction 104 results in first service request 111 being generated by the requestor. First service request 111 is converted using transfer process 135 to second service request 109. Second service request 109 is received by interface processor 140 which determines that the account identifier associated with second service request 109 is registered for payment services 106 and transmits second service request 109 to payment services platform 145. Payment services platform 145 determines that second service request 109 is associated with an account identifier which is registered for payment services 106. Payment services platform 145 processes second service request 109 and determines that payment transaction data included indicates that second service request 109 is associated with payment transaction 104 which has moved the credit card balance associated with cardholder 110 to $3,400. Payment services platform 145 also determines payment services 106 requires that the requestor must alert cardholder 110. Payment services platform 145 generates first services response 113 including an instruction that the requestor send an alert to cardholder 110 in accordance with payment services 106. First services response 113 is converted to second services response 114 using transfer process 135. Second services response 114 is sent to the requestor. The requestor sends an electronic alert to a computing device associated with cardholder 110 indicating that the credit card balance associated with cardholder 110 has exceeded the threshold of $3,000.

In the second example, cardholder 110 also uses account registration 115 and creates a registration profile on payment services computer system 107. However, in this example, the registration profile may include information reflecting that cardholder 110 would like to be notified by payment services computer system 107 (rather than the requestor) when the credit card balance associated with cardholder 110 exceeds a threshold of $3,000. The registration profile is therefore registered for payment services 106 with this condition (e.g., alerts should be sent by payment services computer system 107 when the credit card balance exceeds $3,000) applied. As in the first example, payment transaction 104 causes the credit card balance associated with cardholder to exceed $3,000. Again, payment transaction 104 results in first service request 111 being generated by the requestor. First service request 111 is again converted using transfer process 135 to second service request 109. Second service request 109 is received by interface processor 140 which determines that the account identifier associated with second service request 109 is registered for payment services 106 and transmits second service request 109 to payment services platform 145. Payment services platform 145 determines that second service request 109 is associated with an account identifier which is registered for payment services 106. However, payment services platform 145 determines that second service request 109 is associated with an account identifier which is registered for SMS or email alerts 175 from payment services computer system 107. In this case, in addition to generating a first services response 113 (informing the requestor of the alert), payment services computer system 107 sends an SMS text message directly to a computing device associated with cardholder 110. This option may be valuable for cardholders 110 who value speed or where the requestor lacks the ability to communicate with cardholder 110 electronically.

Payment transaction 104 may also be associated with an account identifier that is registered for card services 150, account services 155, cryptocurrency service 160, and switching and clearing services 165. In this case, cardholder 110 may use account registration 115 which creates a registration profile on payment services computer system 107. The registration profile may include information reflecting that cardholder 110 would like to be able to use services 150, 155, 160, and 165 in conjunction with payment transactions 104.

For example, cardholder 110 may use card services 150 to use a digital enablement services platform for management, generation, and provisioning of digital payment credentials onto mobile devices, PCs, servers, and/or other form factors. In another example, cardholder 110 may also use card services 150 to use a network-implemented rewards services platform that enables cardholders to redeem rewards on any transaction made with an enrolled payment account, and a network-implemented installments services platform that provides instant access to installment financing on existing or approved lines of credit.

Cardholder 110, issuer 120, acquirer 125, and/or merchant 130 may use account services 155, cryptocurrency services 160, and switching and clearing services 165 to use additional services that add value for cardholder 110, issuers 120, acquirers 125, and merchants 130. For example, the account services 155 may include one or more fraud evaluation services implemented by a safety and security services platform that provides to issuers 120 and/or acquirers 125 (and to merchants 130 accessing home payment network 102 through their acquirers 125), or directly to home network processor 112 on behalf of the issuers and/or acquirers and/or merchants that are members of home payment network 102 global-network-fraud detection service, for example. In another example, cryptocurrency services 160 may enable transfer of funds in cryptocurrency between individuals and/or entities. Cryptocurrency services 160 may also enable the exchange of fiat currency into cryptocurrency and vice versa, exchange of one type of cryptocurrency into another type, storing of private keys, managing of the user's crypto wallet, and other services relating to the cryptocurrency technology.

In yet another example, switching and clearing services 165 enables payment transaction 104 originating on off-network payment network 108 to be cleared.

Figure 3:
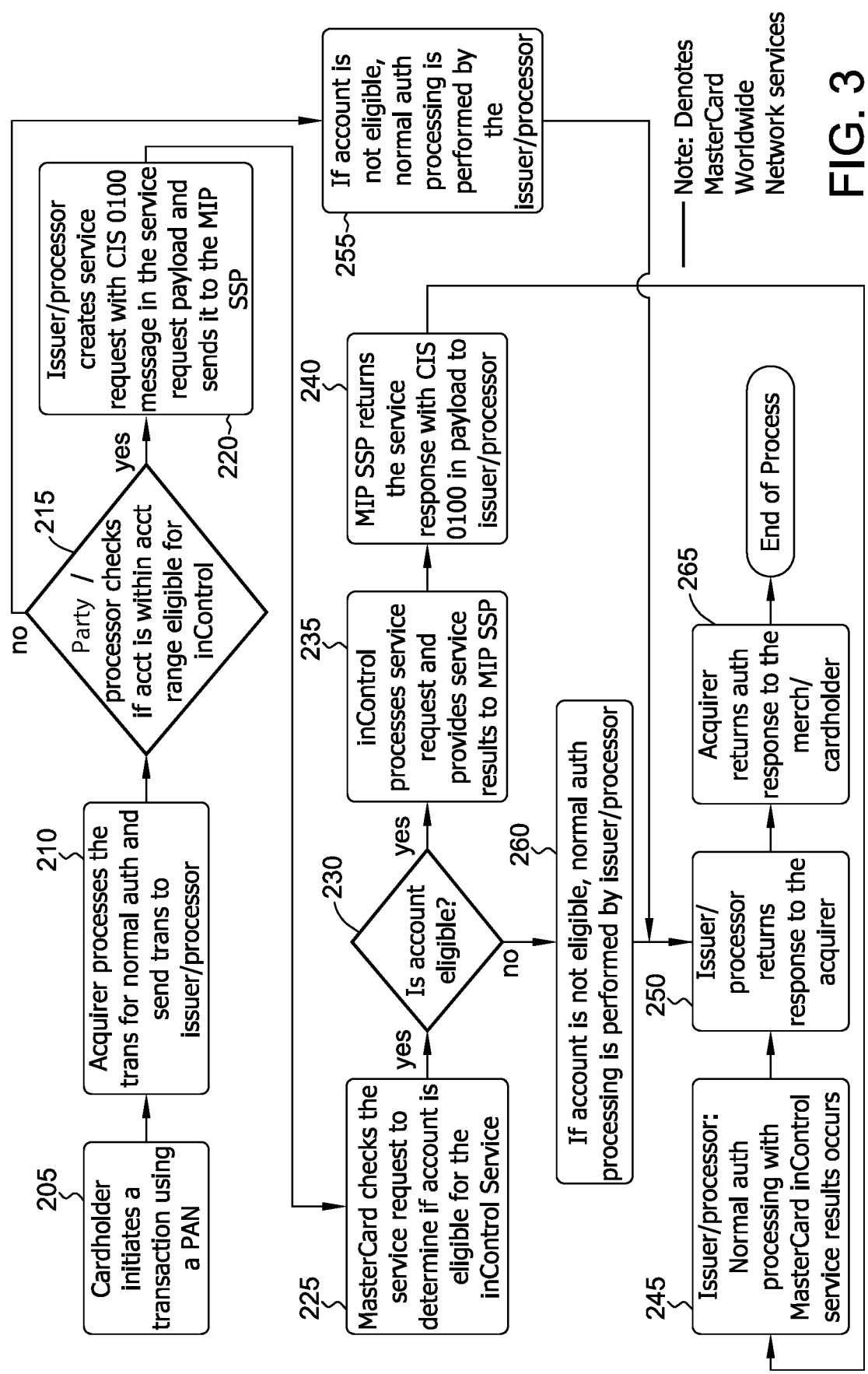
FIG. 3 is a flowchart illustrating an example method implemented by the payment services computer system shown in FIG. 2 for processing a home payment network payment transaction using off-network payment services.

FIG. 3 is a flowchart 200 illustrating an example method implemented by the payment services computer system shown in FIG. 2 for processing a home payment network payment transaction using off-network payment services. Cardholder 110 initiates 205 payment transaction 104 using an account identifier (e.g., a PAN). Acquirer 125 then processes payment transaction 104 for normal authorization and sends 210 payment transaction 104 to the requestor (e.g., home network processor 112, issuer 120, acquirer 125, merchant 130, a payment aggregator, a payment gateway, a government, a financial technology ("Fintech") system, or an account clearing house ("ACH") system). In the example embodiment, where the requestor is home network processor 112, acquirer 125 sends 210 payment transaction 104 to home network processor 112. In alternative embodiments, another party (e.g., issuer 120, acquirer 125, merchant 130, a payment aggregator, a payment gateway, a government, a financial technology ("Fintech") system, or an account clearing house ("ACH") system) is the requestor and acquirer 125 sends 210 payment transaction 104 to the other party. The requestor (e.g. home network processor 112 or other party) then checks 215 if the account is within the account range eligible for payment services 106 (e.g., a lookup or an API call). If the account is not eligible, normal authorization processing is performed 255 by issuer 120 and issuer 120 returns 250 a normal authorization response to acquirer 125 and acquirer 125 returns 265 the authorization response to merchant 130 and cardholder 110 without any additional services being provided with respect to the transaction. If however the account is eligible for payment services 106, the requestor sends 220 a service request message (e.g., second service request 109 converted from first service request 111 using transfer process 135) to interface processor 140. Interface processor 140 sends (not shown) second service request 109 to payment services platform 145. Payment services platform 145 checks 225 second service request 109 to determine if the account is eligible for payment services 106. If the account is not eligible 230, normal authorization processing is performed 260 by issuer 120 and issuer 120 returns a normal authorization response 250 to acquirer 125 and acquirer 125 returns 265 the authorization response to merchant 130 and cardholder 110. If the account is eligible 230 for payment services 106, payment services platform 145 processes second service request 109 and generates 235 a first services response 113. Payment services response also provides 235 first services response 113 to interface processor 140. Interface processor 140 returns 240 off-network service response 113 to the requestor. In returning 240 first services response 113, first services response 113 is converted to second services response 114 using transfer process 135. Issuer 120 executes normal authorization with payment services 245. The requestor then returns 250 the authorization response to acquirer 125 and acquirer 125 returns 265 the authorization response to merchant 130 and cardholder 110.

Figure 4:
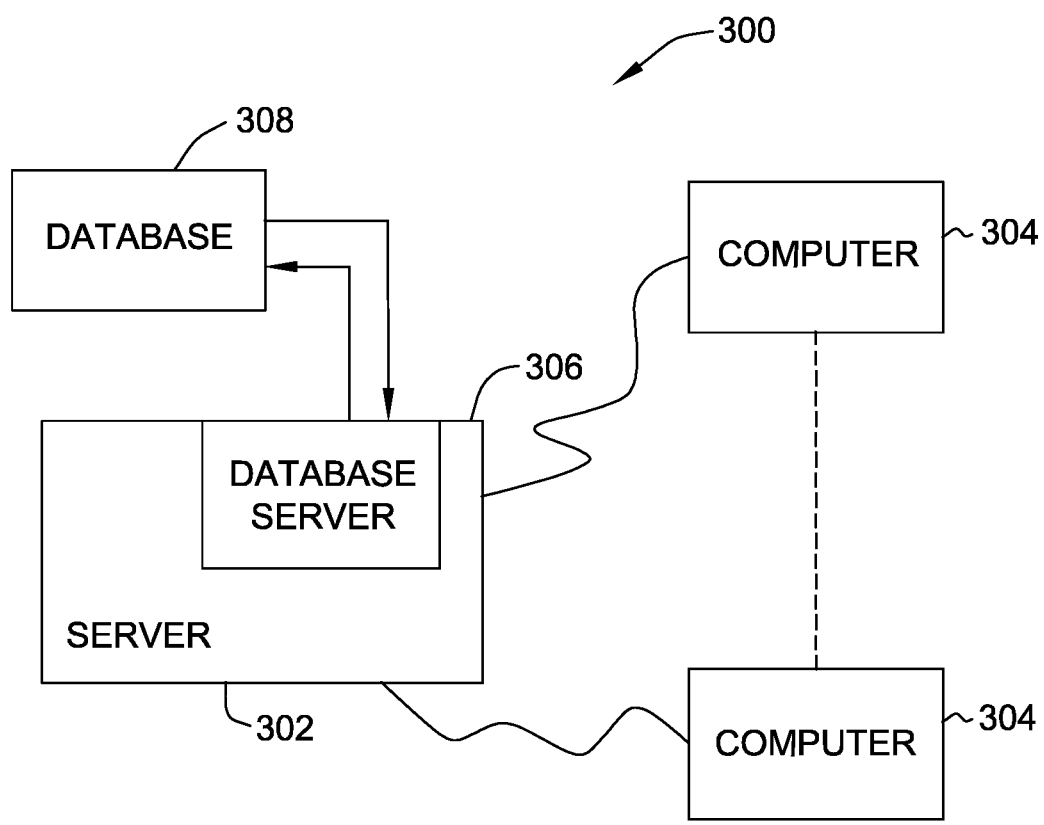
FIG. 4 is a simplified block diagram of an example computer system representative of the payment services platform in the payment processing environment, shown in FIG. 2.

FIG. 4 is a simplified block diagram of an example computer system 300 representative of payment services platform 145 in payment processing environment 100 (both shown in FIG. 2). In the example embodiment, system 300 includes a server system 302 and a plurality of client subsystems, also referred to as client systems 304, connected to server system 302. In one embodiment, client systems 304 are computers including a web browser, such that server system 302 is accessible to client systems 304 using the Internet. Client systems 304 are interconnected to the Internet through many interfaces including a network, such as a local area network (LAN) and/or a wide area network (WAN), dial-in connections, cable modems, wireless-connections, and special high-speed ISDN lines. Client systems 304 may be any device capable of interconnecting to the Internet including a web-based phone, personal digital assistant (PDA), or other web-connectable equipment. A database server 306 is connected to a database 308 containing information on a variety of matters, as described below in greater detail. In one embodiment, database 308 is stored on server system 302 and may be accessed by potential users at one of client systems 304 by logging onto server system 302 through one of client systems 304. In any alternative embodiment, database 308 is stored remotely from server system 302 and may be non-centralized.

As discussed below, payment card information including account numbers, payment card numbers, expiration dates, and account statuses, such as whether the account is open or closed, is stored within database 308. Further, data relating to the cardholder of a payment card may also be stored within database 308. Such cardholder data may include, for example, cardholder name and cardholder billing address.

Figure 5:
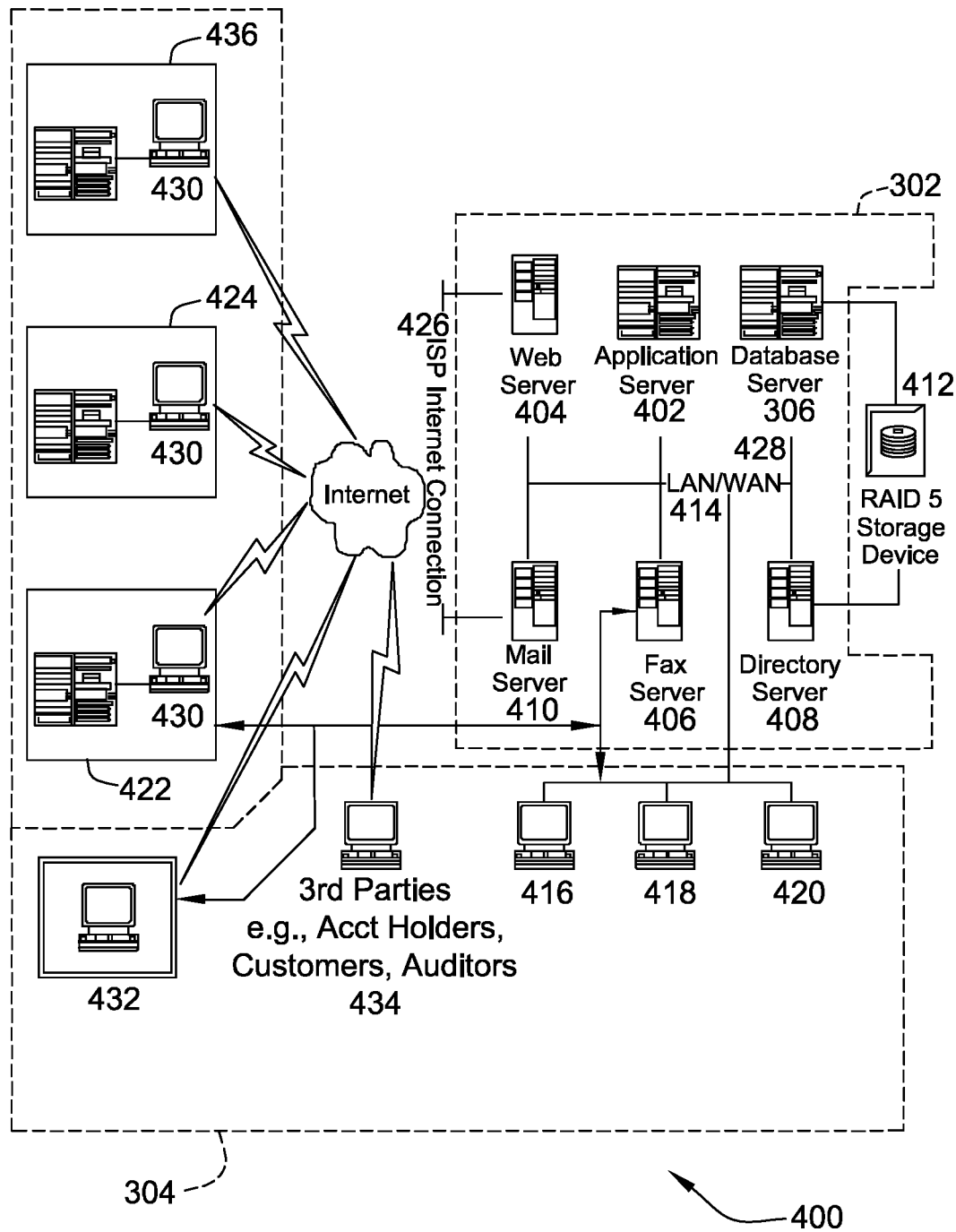
FIG. 5 is an expanded block diagram of an example embodiment of a server architecture of the payment services computer system shown in FIG. 2.

FIG. 5 is an expanded block diagram of an example embodiment of a server architecture of system 400 in accordance with one embodiment of the present disclosure. Components in system 400, identical to components of system 300 (shown in FIG. 4), are identified in FIG. 5 using the same reference numerals used in FIG. 4. System 400 includes server system 302 and client systems 304. Server system 302 further includes database server 306, an application server 402, a web server 404, a fax server 406, a directory server 408, and a mail server 410. A disk storage unit 412 is coupled to database server 306 and directory server 408. Servers 306, 402, 404, 406, 408, and 410 are coupled in a local area network (LAN) 414. In addition, a system administrator's workstation 416, a user workstation 418, and a supervisor's workstation 420 are coupled to LAN 414. Alternatively, workstations 416, 418, and 420 are coupled to LAN 414 using an Internet link or are connected through an Intranet.

Each workstation, 416, 418, and 420, is a personal computer having a web browser. Although the functions performed at the workstations typically are illustrated as being performed at respective workstations 416, 418, and 420, such functions can be performed at one of many personal computers coupled to LAN 414. Workstations 416, 418, and 420 are illustrated as being associated with separate functions only to facilitate an understanding of the different types of functions that can be performed by individuals having access to LAN 414.

Server system 302 is configured to be communicatively coupled to various entities, including acquirers 422 and issuers 424, and to third parties 434, e.g., auditors or customers using an Internet connection 426 or a "direct services access" (DSA) framework that may implemented as a Mastercard® inControl™ platform ("MIP"), shown in FIG. 2. In some embodiments, third-parties 434 may include processors, payment aggregators, payment gateways, governments, fintechs, Account Clearing House (ACH). Server system 302 may also be communicatively coupled with a merchant 436. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 428, local area network 414 could be used in place of WAN 428.

In the example embodiment, any authorized individual or entity having a workstation 430 may access system 400. At least one of the client systems includes a manager workstation 432 located at a remote location. Workstations 430 and 432 include personal computers having a web browser. Also, workstations 430 and 432 are configured to communicate with server system 302. Furthermore, fax server 406 communicates with remotely located client systems, including a client system 432, using a telephone link. Fax server 406 is configured to communicate with other client systems 416, 418, and 420 as well.

Figure 6:
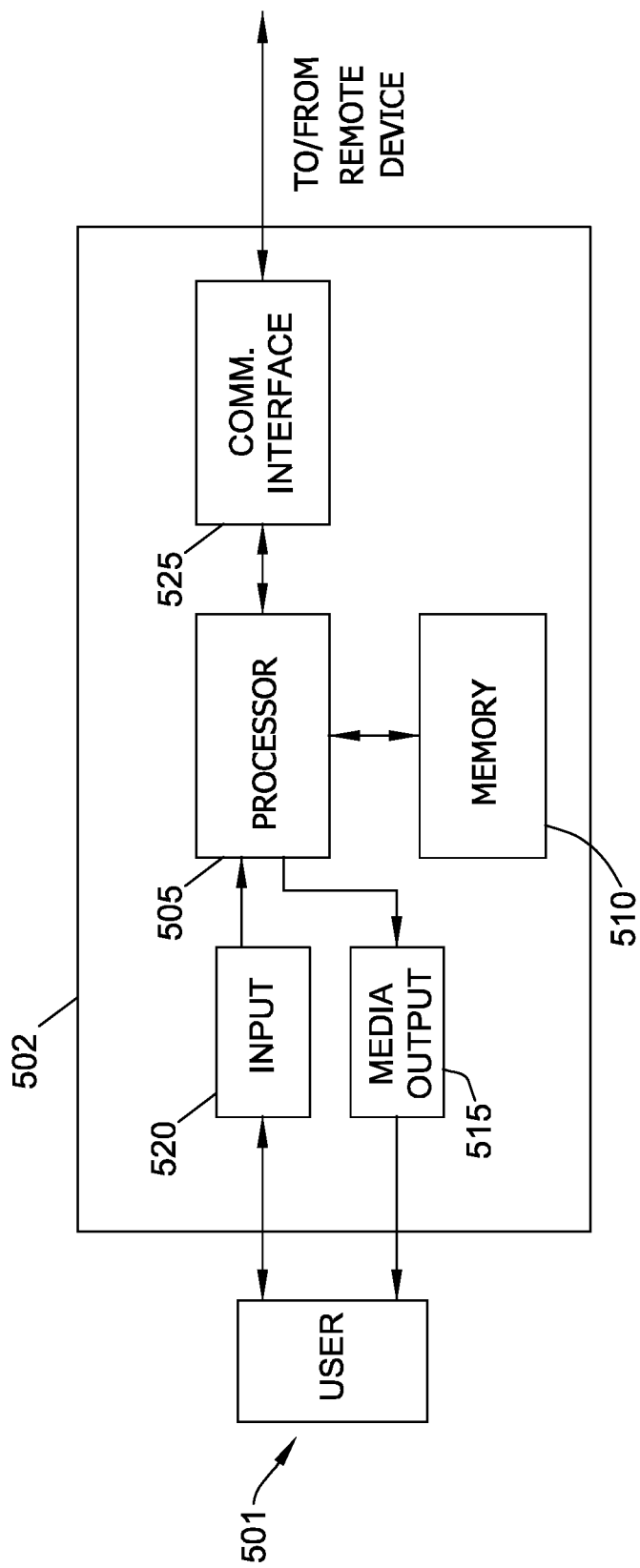
FIG. 6 illustrates an example configuration of a cardholder computer device operated by a cardholder shown in FIGS. 4 and 5.

FIG. 6 illustrates an example configuration of a cardholder computer device 502 operated by a cardholder 501. Cardholder computer device 502 may include, but is not limited to, client systems 304, 416, 418, and 420, workstation 430, and manager workstation 432 (shown in FIG. 5).

Cardholder computer device 502 includes a processor 505 for executing instructions. In some embodiments, executable instructions are stored in a memory area 510. Processor 505 may include one or more processing units (e.g., in a multi-core configuration). Memory area 510 is any device allowing information such as executable instructions and/or other data to be stored and retrieved. Memory area 510 may include one or more computer readable media.

Cardholder computer device 502 also includes at least one media output component 515 for presenting information to cardholder 501. Media output component 515 is any component capable of conveying information to cardholder 501. In some embodiments, media output component 515 includes an output adapter such as a video adapter and/or an audio adapter. An output adapter is operatively coupled to processor 505 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, cardholder computer device 502 includes an input device 520 for receiving input from cardholder 501. Input device 520 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 515 and input device 520.

a Cardholder computer device 502 may also include communication interface 525, which is communicatively couplable to a remote device such as server system 302 or a web server operated by a merchant. Communication interface 525 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 510 are, for example, computer readable instructions for providing a user interface to cardholder 501 via media output component 515 and, optionally, receiving and processing input from input device 520. A user interface may include, among other possibilities, a web browser and client application. Web browsers enable cardholders, such as cardholder 501, to display and interact with media and other information typically embedded on a web page or a website from server system 302 or a web server associated with a merchant. A client application allows cardholder 501 to interact with a server application from server system 302 or a web server associated with a merchant.

Figure 7:
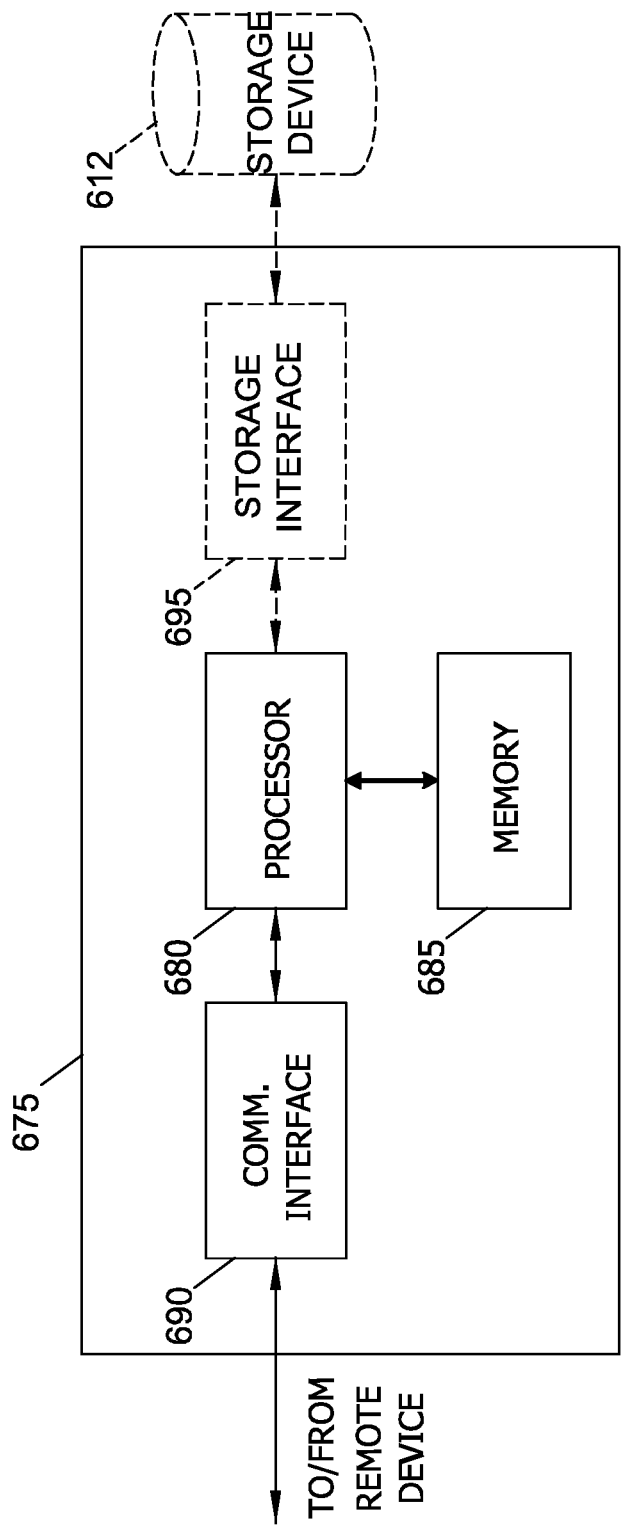
FIG. 7 illustrates an example configuration of the server computer device shown in FIGS. 4 and 5.

FIG. 7 illustrates an example configuration of a server computer device 675 such as server system 302 (shown in FIGS. 4 and 5). Server computer device 675 may include, but is not limited to, database server 306, application server 402, web server 404, fax server 406, directory server 408, and mail server 410 (shown in FIGS. 4 and 5).

Server computer device 675 includes a processor 680 for executing instructions. Instructions may be stored in a memory area 685, for example. Processor 680 may include one or more processing units (e.g., in a multi-core configuration).

Processor 680 is operatively coupled to a communication interface 690 such that server computer device 675 is capable of communicating with a remote device such as cardholder computer device 502 (shown in FIG. 6) or another server computer device 675. For example, communication interface 690 may receive requests from client systems 304 via the Internet, as illustrated in FIGS. 4 and 5.

Processor 680 may also be operatively coupled to a storage device 612 similar to storage device 412 (shown in FIG. 5). Storage device 612 is any computer-operated hardware suitable for storing and/or retrieving data. In some embodiments, storage device 612 is integrated in server computer device 675. For example, server computer device 675 may include one or more hard disk drives as storage device 612. In other embodiments, storage device 612 is external to server computer device 675 and may be accessed by a plurality of server computer devices 675. For example, storage device 612 may include multiple storage units such as hard disks or solid state disks in a redundant array of inexpensive disks (RAID) configuration. Storage device 612 may include a storage area network (SAN) and/or a network attached storage (NAS) system.

In some embodiments, processor 680 is operatively coupled to storage device 612 via a storage interface 695. Storage interface 695 is any component capable of providing processor 680 with access to storage device 612. Storage interface 695 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 680 with access to storage device 612.

Memory area 685 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 8:
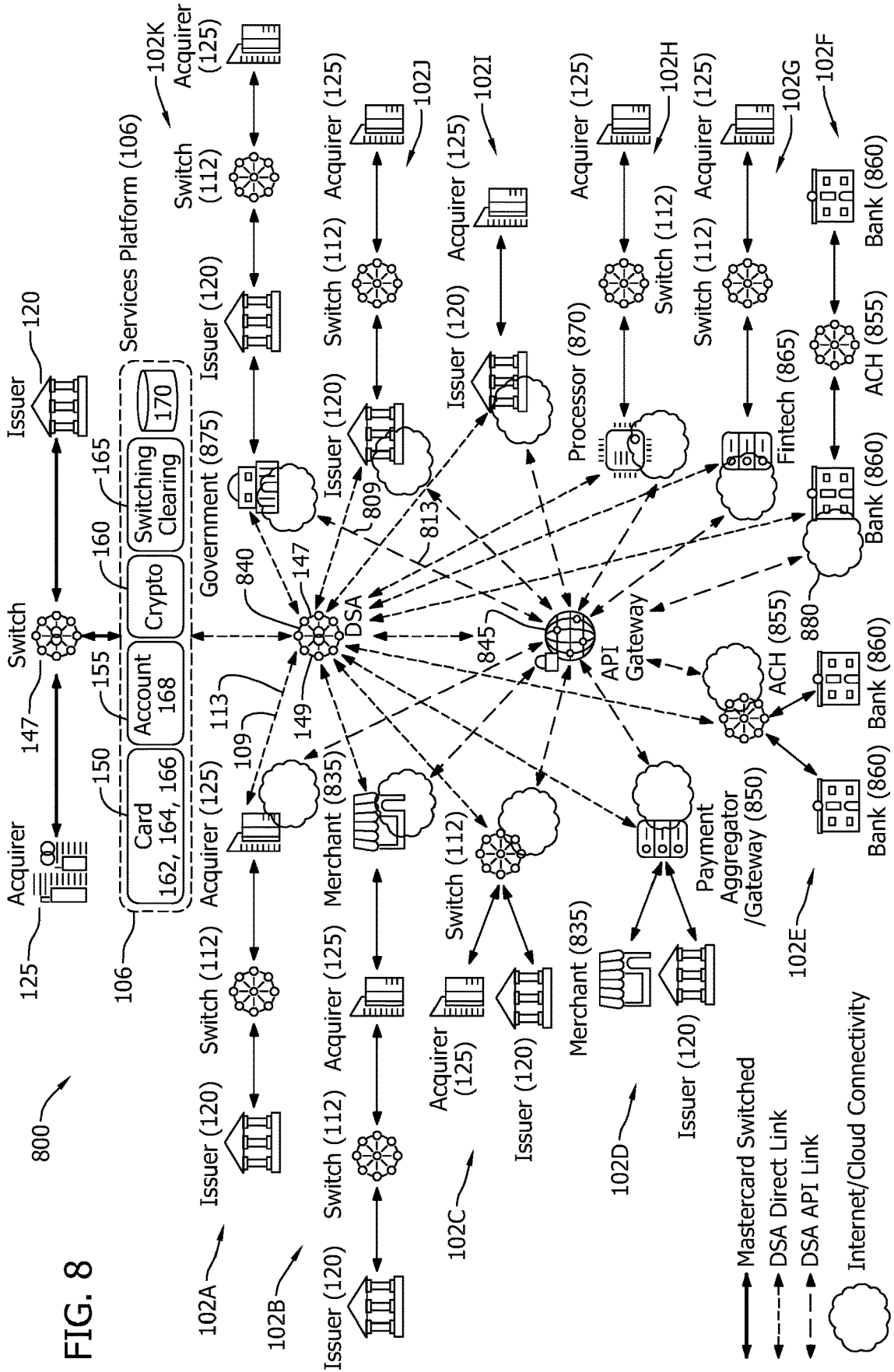
FIG. 8 illustrates an example configuration of a network services bridge computing system including a direct service access ("DSA") platform.

FIG. 8 illustrates an example configuration of a network services bridge computing system 800 including a "direct services access" (DSA) framework 840 and an API gateway 845. In particular, network services bridge computing system 800 incorporates and extends upon payment processing environment 100 (shown in FIG. 2), and like components are numbered accordingly. Moreover, DSA framework 840 is another example embodiment of interface processor 140 (shown in FIG. 2) described above, with additional functionality as described in more detail below. Eleven different examples of home payment networks 102, designated 102A, 102B, 102C, 102D, 102E, 102F, 102G, 102H, 102I, 102J, and 102K are also illustrated in FIG. 8.

With reference to FIGS. 2 and 8, in the example embodiment, in addition or alternatively to the services 150, 155, 160, and 165 described above, services 106 include one or more of services 162, 164, 166, and 168 as described below. Those of ordinary skill in the art will understand how services 162, 164, 166, and 168 hosted by off-network payment network 108 are conventionally implemented for transactions originating on that same payment network 108, and accordingly the description of services 162, 164, 166, and 168 provided below is to provide an overview.

More specifically, card services 150 include cardholder value-added services, such as services 162, 164, and 166. In particular, service 162 is a digital enablement services platform 162 for management, generation, and provisioning of digital payment credentials onto mobile devices, PCs, servers, and/or other form factors. For example, but not by way of limitation, digital enablement services platform 162 links or replaces consumer account credentials stored on traditional payment cards with digital payment credentials provisioned into mobile devices via Secure Element or Host Card Emulation technologies, enabling the consumer's mobile device to perform payments through existing contactless point-of-sale (POS) systems and through new remote payment methods, such as in-app payments or browser payments. For another example, digital enablement services platform 162 supports merchants or commerce platforms that want to tokenize their stored cards-on-file (e.g., to improve security of stored consumer account information), by providing detokenization and dynamic data or cryptography validation for one or more of near field communication (NFC) contactless payments, dynamic magnetic stripe data payments, digital secure remote payments (including in-app, browser, and card-on-file), and dynamic token verification codes.

Service 164 is a network-implemented rewards services platform 164 that enables cardholders to redeem rewards on any transaction made with an enrolled payment account. In particular, network-implemented rewards services platform 164 connects to any points-based loyalty program, e.g., various rewards programs offered by merchants 130 or issuers 120, without requiring direct integration with the merchant POS. Cardholders pay the merchant 130 fully for the cost of the transaction, and receive a rebate via network-implemented rewards services platform 164 to cover the cost of the purchase. The rebate causes points to be deducted from the cardholder's rewards account. In some embodiments, network-implemented rewards services platform 164 offers flexible program parameters for merchants 130 or issuers 120 to configure their rewards programs, including cost per point, purchase thresholds, and merchant-specific promotions.

Service 166 is a network-implemented installments services platform 166 that provides instant access to installment financing on existing or approved lines of credit. In some embodiments, installments services platform 166 offers two options to consumers: pre-purchase and post-purchase installments. In the pre-purchase use case, prior to shopping, card-holders opt-in to automatic installments for purchases at consumer-selected outlets. Cardholders define the installment preference upfront via the issuer's 120 chosen communication channel and the shopping experience through the merchant 130 remains unaltered. In the post-purchase use case, cardholders receive a notification immediately after making a purchase using their payment account. The merchant 130 receives the full price of the transaction per the usual clearing and settlement of the payment card transaction, and off-network payment network 108 implements the installment financing with the consumer and issuer via installments services platform 166.

In addition to cardholder value-added services, services 106 may also include additional services that add value for issuers 120, acquirers 125, and merchants 130. For example, account services 155 includes service 168, which is one or more fraud evaluation services implemented by a safety and security services platform 168 that provides to issuers and/or acquirers (and to merchants accessing home payment network 102 through their acquirers 125), or directly to home network processor 112 on behalf of the issuers and/or acquirers and/or merchants that are members of home payment network 102.

In some embodiments, the fraud evaluation services 168 include a global-network-fraud detection service that continuously monitors all transactions occurring on network 108 in real-time for a number of types of large-scale payment account fraud attacks as they occur, including BIN attacks, CNP (card-not-present) attacks, System Failure, ATM attacks, POS (point-of-sale) attacks, authorization anomalies, and the like. The global-network-fraud detection service implemented via safety and security services platform 168 provides a turnkey solution to help issuers limit their losses from large-scale fraud by acting as a second layer of defense that steps in when an issuer is unable to defend against a large-scale attack due to an issuer system breach or other unforeseen events. Safety and security services platform 168 returns codes in first services response 113 recommending a transaction decline (or prompting/causing a transaction decline) in the event that parameters of the transaction suggest a connection to an active large-scale fraud event detected by the global-network-fraud detection service.

Additionally or alternatively, the fraud evaluation services 168 include a decision-intelligence service that applies machine-learning algorithms, trained using historical data acquired through transactions processed by off-network payment network 108 over a long period of time, to each current transaction to provide detailed insights useful to help issuers 120 make more informed transaction authorization decisions where some more nuanced indicia of fraud are present. Via the machine-learning algorithms, the decision-intelligence service implemented via safety and security services platform 168 effectively applies thousands of data points to each transaction, and provides the insights encoded in first services response 113 as one or more concise reason codes for issuers 120 to leverage in their authorization decisions. For just a few examples, the reason codes may report details such as that the transaction represents an abnormally high frequency of transactions at merchants having the same merchant category code (MCC); a high cumulative withdrawal amount on international ATM; or a suspicious gambling-related activity.

Additionally or alternatively, the fraud evaluation services 168 include a fraud rules management service that enables issuers 120 to rapidly implement and deploy their own predictive fraud rules. The fraud rules management service implemented via safety and security services platform 168 enables issuers to create, maintain, and enhance fraud rules at the payment-network enterprise level, enabling quick definition and implementation of predictive fraud rules that can help to reduce the issuer's 120 fraud losses.

Additionally or alternatively, the fraud evaluation services include an authentication-insights service implemented via safety and security services platform 168 that leverages authentication data, such as consumer device identifier and consumer device location, obtained by a merchant website during online consumer activity to create transaction-level risk assessments that can be provided, via codes embedded in first services responses 113, to issuers 120 in real-time for consideration during authorization. The authentication data may be obtained, for example, from a directory server hosted by off-network payment network 108 that participates in consumer authentication protocols such as the 3DS Protocols owned and updated by EMVCo.

Additionally or alternatively, the fraud evaluation services include an accountholder authentication value (AAV) service implemented via safety and security services platform 168 that verifies, via a code embedded in first services response 113, that a transaction submitted for authorization was previously authenticated for the same payment account number, merchant, and transaction amount, for example to provide assurance to the issuer sufficient for the issuer to forego chargeback rights. Again, the authentication data may be obtained, for example, from a directory server hosted by off-network payment network 108 that participates in consumer authentication protocols such as the 3DS Protocols owned and updated by EMVCo.

In some embodiments, each of digital enablement services platform 162, network-implemented rewards services platform 164, network-implemented installments services platform 166, and safety and security services platform 168 is implemented using a server architecture such as one or more server computer devices 675 (shown in FIG. 7). Alternatively, each of digital enablement services platform 162, network-implemented rewards services platform 164, network-implemented installments services platform 166, and safety and security services platform 168 is implemented in any suitable fashion that enables digital enablement services platform 162, network-implemented rewards services platform 164, network-implemented installments services platform 166, and safety and security services platform 168 to function as described herein.

As noted above, DSA framework 840 is another example embodiment of interface processor 140, and incorporates similar functionality to that described above for interface processor 140. In particular, DSA framework 840 is programmed to communicate with transfer process 135 implemented by one or more computing devices on home payment network 102, as shown in FIG. 2. As discussed above, transfer process 135 is programmed to convert a first data file format associated with home payment network 102 (e.g., first service request 111) to a second data file format associated with off-network payment network 108, as shown in FIG. 2, and also to perform the reverse conversion (e.g., first services response 113 to second services response 114), as shown in FIG. 2. More specifically, as discussed above, each of home payment network 102 and off-network payment network 108 implements its own set of proprietary communications standards for the exchange of financial transaction data and the settlement of funds between financial institutions that are members of the respective payment network. Transfer process 135 is programmed to convert messages (e.g., first service request 111) formatted according to the proprietary standard used by home payment network 102 into messages (e.g., second service request 109) formatted according to the proprietary standard used by off-network payment network 108, and also to perform the reverse conversion (e.g., first services response 113 to second services response 114), as shown in FIG. 2.

In some embodiments, transfer process 135 is implemented as part of a local message handling infrastructure/gateway application for access to home network 102, executable at one or more of issuer 120, acquirer 125, a payment aggregator/payment gateway 850, an account clearing house ("ACH") system 855, a bank 860, a financial technology ("Fintech") system 865, a processor 870, a government 875, and/or home network processor or "switch" 112 on home payment network 102 using DSA framework 840. One example of such a message handling infrastructure/gateway application for access to home network 102 is the Mastercard® Interface Processor ("MIP"), which provides a gateway to, and message handling infrastructure for communications on, the Mastercard® payment network. Alternatively, transfer process 135 is implemented at one or more of issuer 120, acquirer 125, payment aggregator/payment gateway 850, ACH system 855, bank 860, Fintech system 865, processor 870, government 875, and/or home network processor or "switch" 112 in any suitable fashion that enables network services bridge computing system 800 to function as described herein.

Those of skill in the art will appreciate that such proprietary communications standards used by each payment network 102A, 102B, 102C, 102D, 102E, 102F, 102G, 102H, 102I, 102J, 102K, and 108 may be variations of a standardized format, such as ISO 8583 compliant messages. As used herein, "ISO" refers to a series of standards approved by the International Organization for Standardization (ISO is a registered trademark of the International Organization for Standardization of Geneva, Switzerland). The ISO 8583 standard defines acceptable message types, data element locations, and data element values. In addition, the ISO 8583 standard reserves several data element locations for private use. In the example embodiment, off-network payment network 108 recognizes values in certain reserved data elements of its proprietary messaging format as requests for (and/or parameters associated with) one or more of services 150, 155, 160, and 165. Acquirers 125 and issuers 120 operating on off-network payment network 108 are pre-programmed to include the values for such requests and parameters in the data element locations recognized by switch 147, such that service requests originating on off-network payment network 108 are automatically routed to the proper service platforms. Similarly, off-network payment network 108 fills in values in certain other reserved data elements of its proprietary messaging format to provide service responses from the requested one or more services 150, 155, 160, and 165, and acquirers 125 and issuers 120 operating on off-network payment network 108 are pre-programmed to extract the service response values from the data element locations in the messages routed back from the service platform(s) by switch 147. In contrast, each home network 102A, 102B, 102C, 102D, 102E, 102F, 102G, 102H, 102I, 102J, and 102K may already have different designated uses for those reserved data elements in their respective implementations of the proprietary messaging format; however, they may be able to accommodate service request indicators and parameters, and return service responses, in other reserved data element locations for messages routed through their respective switches 112. Accordingly, transfer process 135 as implemented on each home network 102A, 102B, 102C, 102D, 102E, 102F, 102G, 102H, 102I, 102J, and 102K is configured to convert messages received in the proprietary format used by the respective home network 102 (as generated in the normal course by acquirers 125 and issuers 120 operating on that home payment network 102) into the proprietary format used by off-network payment network 108. An alternative approach implemented by API gateway 845 will be discussed in more detail below.

In the example embodiment, messages converted by transfer process 135 are automatically routed to a designated "direct services access" (DSA) port 149 on switch 147 of off-network payment network 108. Switch 147 is programmed to route messages received at DSA port 149 to DSA framework 840 for handling of service requests. Because messages received through DSA port 149 have already been converted to the proprietary messaging format recognized by off-network payment network 108, the service requests can be handled immediately by the service platforms, and the service responses are returned, in the proprietary format used by off-network payment network 108, in near real-time back through DSA framework 840 and switch 147 to the originating transfer process 135. Transfer process 135 performs the reverse conversion to the proprietary format used by the respective home network 102 and provides the converted service response to the requesting issuer 120, acquirer 125, payment aggregator/payment gateway 850, ACH system 855, bank 860, Fintech system 865, processor 870, government 875, and/or home network processor or "switch" 112 on home network 102 for immediate use by the requesting party.

Home networks 102A, 102B, 102C, 102G, 102H, 102J, and 102K are illustrations of payment networks that use home network processor 112 (also referred to as switch 112) to route communications (that are formatted according to the proprietary communications format promulgated by respective home network 102A, 102B, 102C, 102G, 102H, 102J, and 102K) between acquirers 125 and issuers 120 that are members of respective home network 102A, 102B, 102C, 102G, 102H, 102J, and 102K. In other words, switch 112 provides a connection between acquirers 125 and issuers 120 that are separate institutions. As illustrated, each of acquirers 125, issuers 120, and switch 112 on home networks 102A, 102B, 102C, 102G, 102H, 102J, and 102K may implement transfer process 135 locally to gain access to services 106 via off-network payment network switch 147 and DSA framework 840. Acquirers 125 provide a gateway onto home network 102B for merchant 835 (similar to merchant 130 on FIG. 2), onto home network 102G for Fintech system 865, onto home network 102H for processor 870, and onto home network 102K for government 875. Thus, in this architecture, merchant 835, Fintech system 865, processor 870, and government 875 may gain the benefit of services 106 only by arranging for such services through their respective acquirer 125.

Home network 102D is an illustration of a payment network that uses a payment aggregator/payment gateway 850 to route communications (that are formatted according to the proprietary communications format promulgated by home network 102D) between issuers 120 and merchants 835 that are members of the home network 102D. In other words, payment aggregator/payment gateway 850 provides a connection between issuers 120 and merchants 835. As illustrated, each of issuers 120, merchants 835, and payment aggregator/payment gateways 850 on home network 102D may implement transfer process 135 locally to gain access to services 106 via off-network payment network switch 147 and DSA framework 840.

Home networks 102E and 102F are illustrations of payment networks that use an ACH system 855 to route communications (that are formatted according to the proprietary communications format promulgated by home networks 102E and 102F) between banks 860 that are members of the home networks 102E and 102F. In other words, ACH system 855 provides a connection between banks 860 that are separate institutions. As illustrated, each of banks 860 and ACH systems 855 on home networks 102E and 102F may implement transfer process 135 locally to gain access to services 106 via off-network payment network switch 147 and DSA framework 840.

Home network 102I is an illustration of an "on us" payment network. More specifically, in home network 102I, the functions of acquirer 125 and issuer 120 are performed by the same institution, and accordingly home network 102I does not include a switch to route communications between acquirers 125 and issuers 120. As illustrated, institutions functioning as acquirers 125/issuers 120 on home network 102I may implement transfer process 135 locally as part of either acquirer functionality or issuer functionality to gain access to services 106 via off-network payment network switch 147 and DSA framework 840. Acquirer functionality provides a gateway onto home network 102I for merchant 835 (similar to merchant 130 on FIG. 2), Fintech system 865, processor 870, and government 875. Thus, in this architecture, merchant 835, Fintech system 865, processor 870, and government 875 may gain the benefit of services 106 only by arranging for such services through their respective acquirer 125.

Network services bridge computing system 800 also provides an alternative architecture by which participants on certain home networks 102 (e.g., home networks 102A, 102B, 102C, 102D, 102E, 102F, 102G, 102H, 102I, 102J, and 102K) may access services 106 via an API gateway 845 to DSA platform 840. In particular, in addition or alternatively to DSA platform 840 receiving services requests 109 via DSA port 149 of switch 147, DSA platform 840 is also programmed to receive services requests 809 for services 106 via a Direct Services Access (DSA) application programming interface (API) provided by API gateway 845. The API defines a plurality of parameters that generally correspond to the plurality of data fields of the proprietary communications standard handled by transfer process 135.

In the example embodiment, the DSA API provides access to services 106 via remote procedure call (RPC)-style stateless web services, wherein each operation to be performed is represented by an API endpoint. In some embodiments, the DSA API uniform resource locator (URL) format is as follows:

| URL Element | Definition |
| --- | --- |
| scheme | https |
| host[:port] | Hostname (and port number if required) for the host domain (e.g., api.servicesnetwork.com) |
| contextRoot | /Direct-Service-API/Services |
| Method | Post |

In the example embodiment, the DSA API is accessible via hypertext transfer protocol (HTTP), and each endpoint in the API specifies the HTTP Method (e.g., "Post") used to access it. API gateway 845 receives services requests 809 formatted according to the HTTP Method and including payloads specifying values for the relevant parameters (e.g., account identifier, requestor identifier, authorization process details) of the underlying authorization process being performed on any home networks 102. API gateway 845 then communicates the parameters to DSA platform 840, which communicates with the services 106 to obtain service results and passes the results back to API gateway 845. Similarly, API gateway 845 returns services responses 813 formatted according to the HTTP Method and including payloads specifying the values returned by the applicable services 106. In the example embodiment, the payloads for services requests 809 and services responses 813 are sent in the JavaScript Object Notation (JSON) data-interchange format. For example, DSA API request parameters corresponding to the account identifier and requestor identifier(s) may be specified as follows:

| API Request Parameter | Corresponding data element in an equivalent ISO 8583-formatted services request 109 | Description |
| --- | --- | --- |
| card.accountNumber | DE002 | The number that is embossed or encoded (or both) on a payment card corresponding to the account for which the authorization process on home network 102 is being conducted; identifies both the issuer and the particular cardholder account |
| cardacceptor.acquirerID | DE032 | Acquiring institution identification code |
| cardAcceptor.terminalID | DE041 | Merchant terminal identification code |

Alternatively, the DSA API is implemented using any suitable protocol and data-interchange format.

In the example embodiment, the requestor (e.g., home network processor or "switch" 112, issuer 120, acquirer 125, merchant 835, payment aggregator/payment gateway 850, ACH 855, Fintech 865, or government 875) accesses the DSA API via a local cloud interface 880. For example, cloud interface 880 may be provided by a subscription to a public cloud service such as Amazon® Web Service (AWS) or Microsoft® Azure. In some embodiments, the use of cloud interface 880 provides technical advantages to requestors in implementing connectivity to the DSA API, due to pre-existing cloud interface features such as encryption protocols (e.g., Transport Layer Security (TLS) using Secure Sockets Layer (SSL)) that keep data secure during transport between the requestor and DSA platform 840. Additionally or alternatively, code development to implement connectivity to the DSA API through cloud interface 880 may be significantly less resource-intensive as compared to implementing transfer process 135 within the confines of the message handling infrastructure/gateway application for access to home networks 102. Moreover, in certain embodiments, merchants 835 with cloud connectivity may use cloud interface 880 to access certain services 106 directly.

Alternatively, each requestor implements connectivity to the DSA API using any suitable interface.

In certain embodiments, DSA platform 840 automatically applies eligible services associated with one or more identifiers included in the services request message 109 or 809. For example, when a requestor on one of home networks 102 registers with off-network payment network 108 for access to one or more services 106, a record is stored in a registered services database 170 (shown inn FIG. 2) accessible by DSA platform 840. The record associates a requestor identifier with the one or more services 106 for which the requestor is registered. For example, the requestor may be one of the acquirers 125 and issuers 120 that are members of home payment network 102, one of the payment aggregator/payment gateway 850, ACH system 855, Fintech system 865, processor 870, and/or government 875 that are members of home payment network 102, or home network processor or "switch" 112 that registers for the service directly, enabling it to provide service results to its issuers, acquirers, merchants, and/or other requestors for the results. For example, each requestor identifier may be a unique numeric or alphanumeric code. For example, the requestor identifier may be a merchant identifier associated with a merchant 835, a bank identification number (BIN) associated with an issuer 120, an acquirer identifier associated with acquirer 125, or a payment network identifier associated with home payment network 102.

After registration, each service request 109 and/or 809 transmitted to DSA platform 840 by the requestor includes the requestor identifier. DSA platform 840 queries registered services database 170 for records including the requestor identifier, and the query returns the one or more services for which the requestor has registered. DSA platform 840 automatically extracts the parameters associated with each registered service from the service request 109 and/or 809, and automatically routes each request and associated parameters to one or more of the service platforms 150, 155, 160, and 165 corresponding to the one or more services for which the requestor has registered.

Similarly, when a cardholder 22 (shown in FIG. 1) of a payment account registers with off-network payment network 108 for access to one or more services 106, a record is stored in a registered services database 170. The record associates an account identifier with the one or more services 106 for which the account is registered. For example, each account identifier may be a unique numeric or alphanumeric code. For example, the account identifier may be, or may be a token or virtual account number linked to, a primary account number (PAN) associated with the account.

With respect to some services, the record stored in registered services database 170 may include additional fields that store information specific to the requestor identifier or account identifier and the particular service. As one example, for an account identifier registered with cardholder-defined rules service 160, the specific rules and limits selected by the cardholder (as discussed above) may also be stored in (or linked to) the record that associates the account identifier and the service. Additionally or alternatively, the services platform that implements service 160 may store and access the information specific to the requestor identifier or account identifier and the particular service in a separate database.

Each service request 109 and/or 809 transmitted to DSA platform 840 by a requestor includes the account identifier used for the underlying transaction. DSA platform 840 queries registered services database 170 for records including the account identifier, and the query returns the one or more services for which the account has been registered. DSA platform 840 automatically extracts the parameters associated with each registered service from the service request 109 and/or 809, and automatically routes each request and associated parameters to one or more of the service platforms 150, 155, 160, and 165 corresponding to the one or more services for which the account has been registered.

In some embodiments, network services bridge computing system 800 provides an improvement to the performance of home payment networks 102, in that each home payment network 102 does not need to devote data storage resources and processing resources to track, and/or to include in each service request 109 and/or 809, a list of every off-network service for which each cardholder, acquirer 125, issuer 120, merchant 835, aggregator/payment gateway 850, ACH system 855, Fintech system 865, processor 870, government 87, and/or "switch" 112 has registered in order to obtain the appropriate service response 113 or 813. Instead, DSA platform 840 more efficiently tracks registered services for each requestor across all home networks 102 in a central location (e.g., registered services database 170) local to DSA platform 840.

Alternatively, registered services for each requestor and/or cardholder are tracked in any suitable fashion that enables network services bridge computing system 800 to function as described herein.

In certain embodiments, DSA platform 840 accepts, in a single services request message 109 or 809, requests for multiple services 106 associated with a single authorization process on one of home payment networks 102, and returns responses for the multiple requested services in a single services response message 113 or 813. For example, the requestor may be registered for multiple services, the account may be registered for multiple services, and/or the multiple services may include at least one service for which the requestor has registered and at least one service for which the account has been registered.

Figure 9:
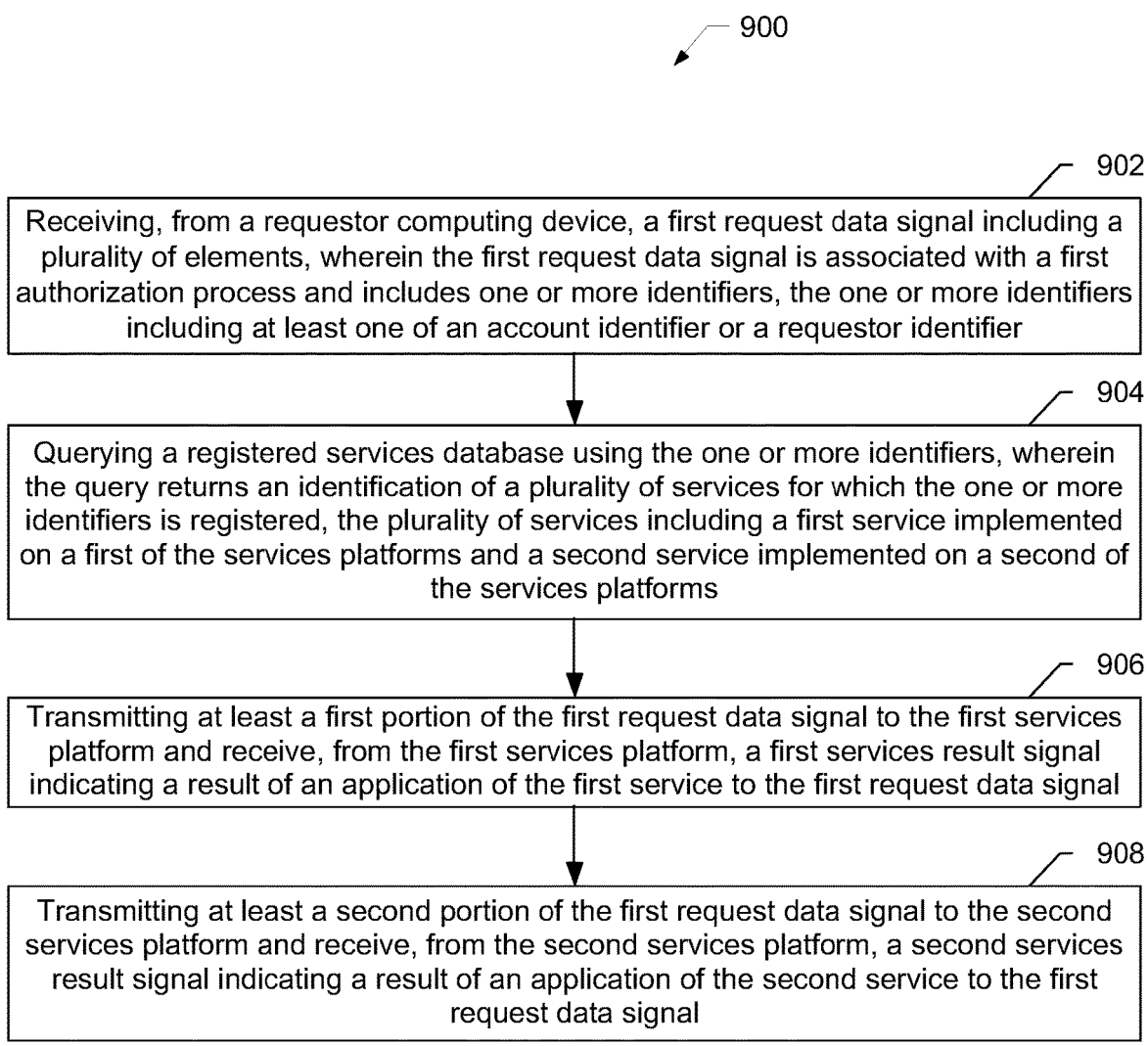
FIG. 9 is a flow diagram of an example method of implementing multiple off-network services to a single network authorization process, which may be implemented by the network services bridge computing system shown in FIG. 8.

FIG. 9 is a flow diagram of an example method 900 of implementing multiple off-network services to a single network authorization process, which may be implemented by the network services bridge computing system shown in FIG. 8. Method 900 includes receiving 902, from a requestor computing device, a first request data signal including a plurality of elements, where the first request data signal is associated with a first authorization process and includes one or more identifiers, the one or more identifiers including at least one of an account identifier or a requestor identifier. Method 900 also includes querying 904 a registered services database using the one or more identifiers, where the query returns an identification of a plurality of services for which the one or more identifiers is registered, the plurality of services including a first service implemented on a first of the services platforms and a second service implemented on a second of the services platforms. Method 900 further includes transmitting 906 at least a first portion of the first request data signal to the first services platform and receive, from the first services platform, a first services result signal indicating a result of an application of the first service to the first request data signal. In addition, method 900 includes transmitting 908 at least a second portion of the first request data signal to the second services platform and receive, from the second services platform, a second services result signal indicating a result of an application of the second service to the first request data signal. Method 900 also includes transmitting 910, to the requestor computing device, a first response data signal that includes a consolidated response code, the consolidated response code indicating whether the first authorization process should be completed based on the first and second result signals.

In some embodiments, the first response data signal includes an indication identifying each of the plurality of services that was identified as being applicable to the first request data signal. In other embodiments, the first response data signal further includes a plurality of service-result codes, each of the plurality of service-result codes indicating a separate result of the application of a corresponding service of the plurality of services. In further embodiments, at least one of the first services result signal and the second services result signal includes at least one additional value, and where the first response data signal further includes the at least one additional value in addition to the plurality of service-result codes. In yet other embodiments, the one or more identifiers includes the requestor identifier, and where the first service and the second service include two services from among a virtual card mapping service, a digital payment credential provisioning service, and a fraud evaluation service. The one or more identifiers may also include the account identifier, and where the first service and the second service include two services from among an accountholder-defined alert notifications service, an accountholder-defined rules service, a network-implemented rewards service, and a network-implemented installment financing service. The one or more identifiers may further include the requestor identifier and the account identifier, where the first service includes one of a virtual card mapping service, a digital payment credential provisioning service, and a fraud evaluation service, and where the second service includes one of an accountholder-defined alert notifications service, an accountholder-defined rules service, a network-implemented rewards service, and a network-implemented installment financing service.

In some embodiments, first request data signal is formatted according to a communications standard for exchange of financial transaction data between financial institutions, the communications standard defining a plurality of data fields to be included within data signals compliant with the communications standard. The first request data signal may be also formatted according to a hypertext transfer protocol (HTTP).

In other embodiments, the first requestor computing device is on a first network and the plurality of services platforms are hosted on a second network, and where the instructions are further executable to cause said at least one processor to receive the first request data signal via a network switch on the second network. The first requestor computing device mat be on a first network and the plurality of services platforms are hosted on a second network, and where the instructions are further executable to cause said at least one processor to receive the first request data signal via a gateway for an application programming interface (API), the API defining a plurality of parameters corresponding to a plurality of data fields of a communications standard for exchange of financial transaction data between financial institutions on the second network.

Figure 10:
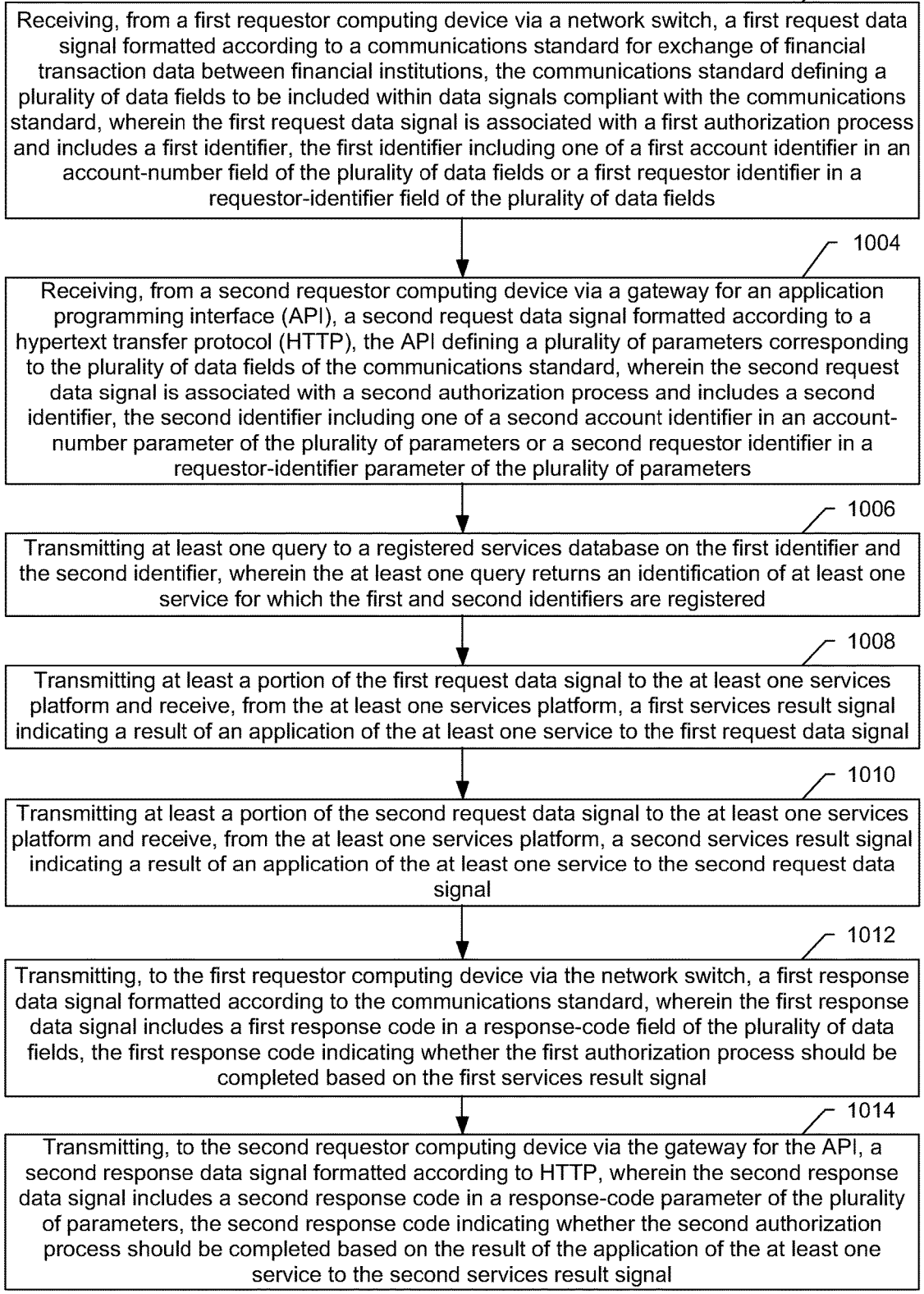
FIG. 10 is a flow diagram of an example method for providing multiple channels to requestors for access to at least one off-network services platform, which may be implemented by the network services bridge computing system shown in FIG. 8.

FIG. 10 is a flow diagram of an example method 1000 for providing multiple channels to requestors for access to at least one off-network services platform, which may be implemented by the network services bridge computing system shown in FIG. 8. Method 1000 includes receiving 1002, from a first requestor computing device via a network switch, a first request data signal formatted according to a communications standard for exchange of financial transaction data between financial institutions, the communications standard defining a plurality of data fields to be included within data signals compliant with the communications standard, where the first request data signal is associated with a first authorization process and includes a first identifier, the first identifier including one of a first account identifier in an account-number field of the plurality of data fields or a first requestor identifier in a requestor-identifier field of the plurality of data fields. Method 1000 also includes receiving 1004, from a second requestor computing device via a gateway for an application programming interface (API), a second request data signal formatted according to a hypertext transfer protocol (HTTP), the API defining a plurality of parameters corresponding to the plurality of data fields of the communications standard, where the second request data signal is associated with a second authorization process and includes a second identifier, the second identifier including one of a second account identifier in an account-number parameter of the plurality of parameters or a second requestor identifier in a requestor-identifier parameter of the plurality of parameters. Method 1000 further includes transmitting 1006 at least one query to a registered services database on the first identifier and the second identifier, where the at least one query returns an identification of at least one service for which the first and second identifiers are registered.

In addition, method 1000 includes transmitting 1008 at least a portion of the first request data signal to the at least one services platform and receive, from the at least one services platform, a first services result signal indicating a result of an application of the at least one service to the first request data signal. Method 1000 also includes transmitting 1010 at least a portion of the second request data signal to the at least one services platform, and receiving, from the at least one services platform, a second services result signal indicating a result of an application of the at least one service to the second request data signal. Method 1000 further includes transmitting 1012, to the first requestor computing device via the network switch, a first response data signal formatted according to the communications standard, where the first response data signal includes a first response code in a response-code field of the plurality of data fields, the first response code indicating whether the first authorization process should be completed based on the first services result signal. Method 1000 also includes transmitting 1014, to the second requestor computing device via the gateway for the API, a second response data signal formatted according to HTTP, where the second response data signal includes a second response code in a response-code parameter of the plurality of parameters, the second response code indicating whether the second authorization process should be completed based on the result of the application of the at least one service to the second services result signal This written description uses examples to illustrate the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A network services bridge computing system comprising:
   a direct service access (DSA) platform in communication with a home network and an off-network, the DSA platform comprising a memory and at least one processor in communication with the memory and with a plurality of services platforms, the memory storing instructions executable to cause the at least one processor to:
   receive, from a requestor computing device, a first request data signal including a plurality of elements, wherein the first request data signal is associated with a first authorization process and includes one or more identifiers, the one or more identifiers including at least one of an account identifier or a requestor identifier, the first request data signal originating in the home network;
   query a registered services database using the one or more identifiers, wherein the query returns an identification of a plurality of services for which the one or more identifiers is registered, the plurality of services including a first service implemented on a first of the services platforms and a second service implemented on a second of the services platforms, the services platform implemented in the off-network;
   convert a format of at least a first portion of the first request data signal to a first proprietary messaging format recognized by the first services platform and the off-network, the format recognized by the home network;
   transmit the first portion of the first request data signal to the first services platform;
   receive, from the first services platform, a first services result signal indicating a result of an application of the first service to the first request data signal;
   convert the format of at least a second portion of the first request data signal to a second proprietary messaging format recognized by the second services platform and the off-network;
   transmit the second portion of the first request data signal to the second services platform;
   receive, from the second services platform, a second services result signal indicating a result of an application of the second service to the first request data signal; and
   transmit, to the requestor computing device, a first response data signal that includes a consolidated response code, the consolidated response code indicating whether the first authorization process has to be completed based on the first and second result signals.

2. The network services bridge computing system according to claim 1, wherein the first response data signal further includes an indicator identifying each of the plurality of services that was identified as being applicable to the first request data signal.

3. The network services bridge computing system according to claim 1, wherein the first response data signal further includes a plurality of service-result codes, each of the plurality of service-result codes indicating a separate result of the application of a corresponding service of the plurality of services.

4. The network services bridge computing system according to claim 3, wherein at least one of the first services result signal and the second services result signal includes at least one additional value, and wherein the first response data signal further includes the at least one additional value in addition to the plurality of service-result codes.

5. The network services bridge computing system according to claim 1, wherein the one or more identifiers comprises the requestor identifier, and wherein the first service and the second service comprise two services from among a virtual card mapping service, a digital payment credential provisioning service, and a fraud evaluation service.

6. The network services bridge computing system according to claim 1, wherein the one or more identifiers comprises the account identifier, and wherein the first service and the second service comprise two services from among an accountholder-defined alert notifications service, an accountholder-defined rules service, a network-implemented rewards service, and a network-implemented installment financing service.

7. The network services bridge computing system according to claim 1, wherein the one or more identifiers comprises the requestor identifier and the account identifier, wherein the first service comprises one of a virtual card mapping service, a digital payment credential provisioning service, and a fraud evaluation service, and wherein the second service comprises one of an accountholder-defined alert notifications service, an accountholder-defined rules service, a network-implemented rewards service, and a network-implemented installment financing service.

8. The network services bridge computing system according to claim 1, wherein the first request data signal is formatted according to a communications standard for exchange of financial transaction data between financial institutions, the communications standard defining a plurality of data fields to be included within data signals compliant with the communications standard.

9. The network services bridge computing system according to claim 8, wherein the requestor computing device is on a first network and the plurality of services platforms are hosted on a second network, and wherein the instructions are further executable to cause the at least one processor to receive the first request data signal via a network switch on the second network.

10. The network services bridge computing system according to claim 1, wherein the first request data signal is formatted according to a hypertext transfer protocol (HTTP).

11. The network services bridge computing system according to claim 10, wherein the requestor computing device is on a first network and the plurality of services platforms are hosted on a second network, and wherein the instructions are further executable to cause the at least one processor to receive the first request data signal via a gateway for an application programming interface (API), the API defining a plurality of parameters corresponding to a plurality of data fields of a communications standard for exchange of financial transaction data between financial institutions on the second network.

12. A computer-implemented method using a network services bridge computing system that includes a direct service access (DSA) platform in communication with a home network and an off-network, the DSA platform having a memory and at least one processor in communication with the memory and with a plurality of services platforms, the method comprising:
receiving, by the at least one processor, a first request data signal including a plurality of elements, wherein the first request data signal is associated with a first authorization process and includes one or more identifiers, the one or more identifiers including at least one of an account identifier or a requestor identifier, the first request data signal originating in the home network;
querying, by the at least one processor, a registered services database using the one or more identifiers, wherein the query returns an identification of a plurality of services for which the one or more identifiers is registered, the plurality of services including a first service implemented on a first of the services platforms and a second service implemented on a second of the services platforms, the services platform implemented in the off-network;
converting, by the at least one processor, a format of at least a first portion of the first request data signal to a first proprietary messaging format recognized by the first services platform and the off-network, the format recognized by the home network;
transmitting, by the at least one processor, the first portion of the first request data signal to the first services platform;
receiving, by the at least one processor from the first services platform, a first services result signal indicating a result of an application of the first service to the first request data signal;
converting, by the at least one processor, the format at least a second portion of the first request data signal to a second proprietary messaging format recognized by the second services platform and the off-network;
transmitting, by the at least one processor, the second portion of the first request data signal to the second services platform;
receiving, by the at least one processor from the second services platform, a second services result signal indicating a result of an application of the second service to the first request data signal; and
transmitting, by the at least one processor, a first response data signal that includes a consolidated response code, the consolidated response code indicating whether the first authorization process has to be completed based on the first and second result signals.

13. The computer-implemented method according to claim 12, wherein the first response data signal further includes an indicator identifying each of the plurality of services that was identified as being applicable to the first request data signal.

14. The computer-implemented method according to claim 12, wherein the first response data signal further includes a plurality of service-result codes, each of the plurality of service-result codes indicating a separate result of the application of a corresponding service of the plurality of services.

15. The computer-implemented method according to claim 14, wherein at least one of the first services result signal and the second services result signal includes at least one additional value, and wherein the first response data signal further includes the at least one additional value in addition to the plurality of service-result codes.

16. The computer-implemented method according to claim 12, wherein the one or more identifiers includes the requestor identifier, and wherein the first service and the second service comprise two services from among a virtual card mapping service, a digital payment credential provisioning service, and a fraud evaluation service.

17. The computer-implemented method according to claim 12, wherein the one or more identifiers includes the account identifier, and wherein the first service and the second service comprise two services from among an accountholder-defined alert notifications service, an accountholder-defined rules service, a network-implemented rewards service, and a network-implemented installment financing service.

18. The computer-implemented method according to claim 12, wherein the one or more identifiers includes the requestor identifier and the account identifier, wherein the first service includes one of a virtual card mapping service, a digital payment credential provisioning service, and a fraud evaluation service, and wherein the second service comprises one of an accountholder-defined alert notifications service, an accountholder-defined rules service, a network-implemented rewards service, and a network-implemented installment financing service.

19. The computer-implemented method according to claim 12, wherein the first request data signal is formatted according to a communications standard for exchange of financial transaction data between financial institutions, the communications standard defining a plurality of data fields to be included within data signals compliant with the communications standard.

20. At least one non-transitory computer-readable storage medium that includes computer-executable instructions embodied thereon that when the computer-executable instructions are executed by at least one processor of a direct service access ("DSA") platform in communication with a home network and an off-network, the computer-executable instructions cause the at least one processor to:

receive, from a requestor computing device, a first request data signal including a plurality of elements, wherein the first request data signal is associated with a first authorization process and includes one or more identifiers, the one or more identifiers including at least one of an account identifier or a requestor identifier, the first request data signal originating in the home network;

query a registered services database using the one or more identifiers, wherein the query returns an identification of a plurality of services for which the one or more identifiers is registered, the plurality of services including a first service implemented on a first of the services platforms and a second service implemented on a second of the services platforms, the services platform implemented in the off-network;

convert a format of at least a first portion of the first request data signal to a first proprietary messaging format recognized by the first services platform and the off-network, the format recognized by the home network;

transmit the first portion of the first request data signal to the first services platform;

receive, from the first services platform, a first services result signal indicating a result of an application of the first service to the first request data signal;

convert the format of at least a second portion of the first request data signal to a second proprietary messaging format recognized by the second services platform and the off-network;

transmit the second portion of the first request data signal to the second services platform;

receive, from the second services platform, a second services result signal indicating a result of an application of the second service to the first request data signal; and transmit, to the requestor computing device, a first response data signal that includes a consolidated response code, the consolidated response code indicating whether the first authorization process has to be completed based on the first and second result signals.

* * * * *